(12) United States Patent
Fukui

(10) Patent No.: US 7,714,896 B2
(45) Date of Patent: May 11, 2010

(54) IMAGE CAPTURING APPARATUS AND IMAGE CAPTURING METHOD

(75) Inventor: Toshiyuki Fukui, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 11/555,352

(22) Filed: Nov. 1, 2006

(65) Prior Publication Data

US 2007/0104377 A1    May 10, 2007

(30) Foreign Application Priority Data

Nov. 4, 2005    (JP)    ............... 2005-321230

(51) Int. Cl.
*H04N 5/232* (2006.01)
(52) U.S. Cl. .................................. 348/211.3
(58) Field of Classification Search ............. 348/208.7, 348/208.11; 396/421; 349/208.99, 211.99, 349/211.1, 211.3, 211.4
See application file for complete search history.

(56) References Cited

U.S. PATENT DOCUMENTS 5,455,680 A * 10/1995 Shin .......................... 382/239
7,113,644 B2    9/2006 Ohtani et al.
2005/0140787 A1    6/2005 Kaplinsky ............... 348/207.1

FOREIGN PATENT DOCUMENTS

JP    06-125411    5/1994
JP    2003-309853    10/2003

OTHER PUBLICATIONS

Chinese Office Action issued Jan. 4, 2008, in Chinese Application No. 2006101376987, and English-language translation thereof.

* cited by examiner

*Primary Examiner*—Tuan Ho
(74) *Attorney, Agent, or Firm*—Fitzpatrick, Cella, Harper & Scinto

(57) ABSTRACT

An image processing apparatus that provides multiple services for users who issue various requests on a network, while maintaining the real-time nature of the apparatus. The image processing apparatus includes a developing unit for developing image data to time-varying image data, an image processing unit for performing image processing of the time-varying image data, a network interface for sending out the time-varying image data processed by the image processing unit onto a network, and a network control unit for controlling the time-varying image data for which multiple different image processing operations have been performed by the image processing unit, to be outputted to the network interface within one picture period.

12 Claims, 26 Drawing Sheets

HEAVY-LINE FRAME : UXGA-SIZE IMAGE DATA (1600×1200)

THIN-LINE FRAME : VGA-SIZE (640×480) DATA a TO f ;

QVGA-SIZE (320×240) DATA g AND h
CLIPPED FROM UXGA-SIZE DATA

HEAVY-LINE FRAME : UXGA-SIZE IMAGE DATA (1600×1200) IMAGE DATA d

THIN-LINE FRAME : VGA-SIZE (640×480) DATA b AND c CLIPPED FROM UXGA-SIZE DATA

VGA-SIZE (640×480) DATA a OBTAINED BY
RESOLUTION CONVERSION OF UXGA-SIZE DATA

HEAVY-LINE FRAME : UXGA-SIZE IMAGE DATA (1600×1200) IMAGE DATA e

THIN-LINE FRAME : VGA-SIZE (640×480) DATA c CLIPPED FROM UXGA-SIZE DATA

VGA-SIZE (640×480) DATA a AND b OBTAINED BY
RESOLUTION CONVERSION OF UXGA-SIZE DATA

QVGA-SIZE (320×240) DATA d OBTAINED BY
RESOLUTION CONVERSION OF UXGA-SIZE DATA

HEAVY-LINE FRAME : UXGA-SIZE IMAGE DATA (1600×1200) IMAGE DATA a

THIN-LINE FRAME : VGA-SIZE (640×480) DATA d CLIPPED FROM UXGA-SIZE DATA

VGA-SIZE (640×480) DATA b OBTAINED BY
RESOLUTION CONVERSION OF UXGA-SIZE DATA

QVGA-SIZE (320×240) DATA c OBTAINED BY
RESOLUTION CONVERSION OF UXGA-SIZE DATA

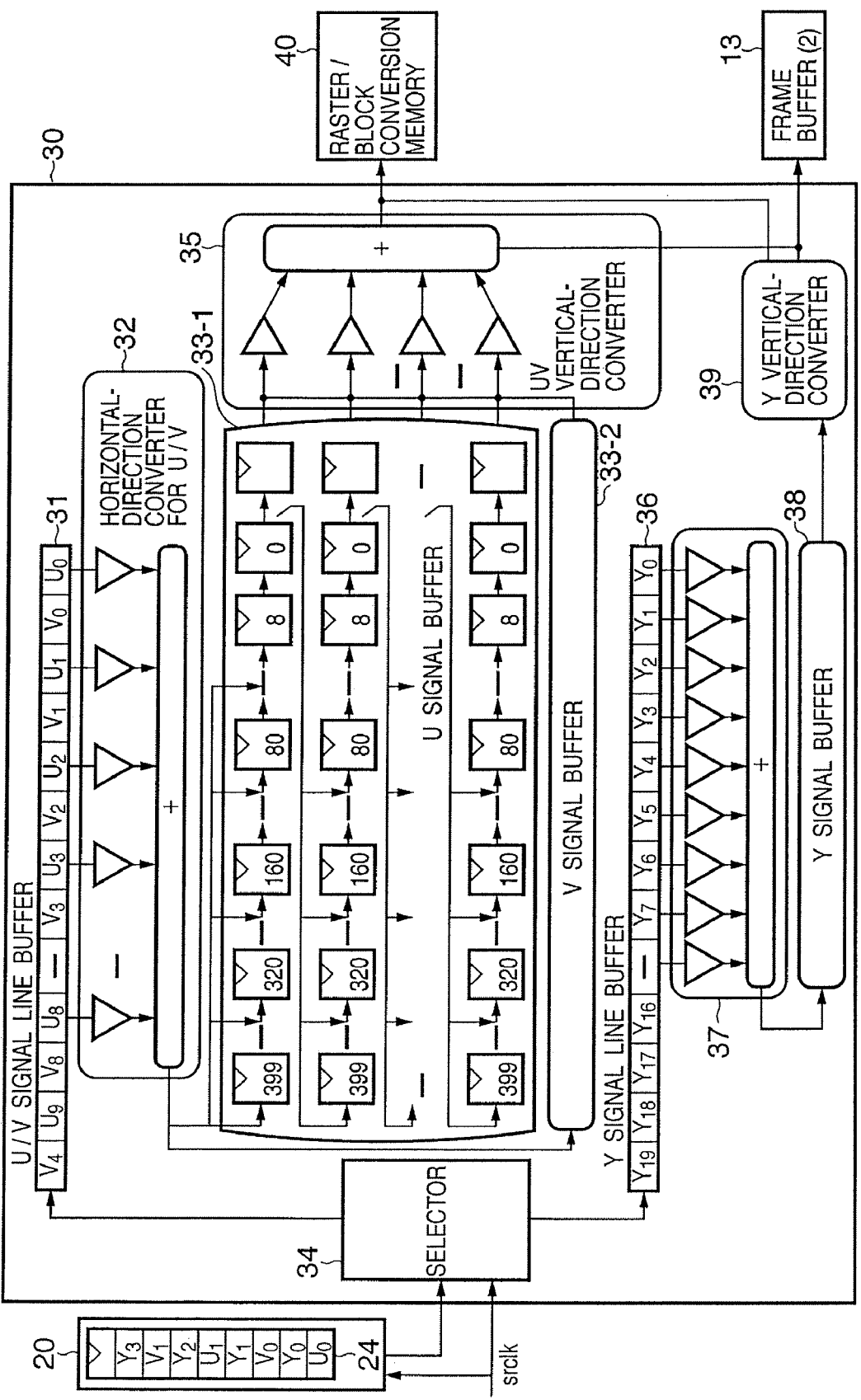
F I G. 20

HEAVY-LINE FRAME : UXGA-SIZE IMAGE DATA (1600×1200) IMAGE DATA d

THIN-LINE FRAME : VGA-SIZE (640×480) DATA b, c AND e CLIPPED FROM UXGA-SIZE DATA

VGA-SIZE (640×480) DATA a OBTAINED BY
RESOLUTION CONVERSION OF UXGA-SIZE DATA

IMAGE CAPTURING APPARATUS AND IMAGE CAPTURING METHOD

BACKGROUND OF THE INVENTION

1. Field of the Invention

The present invention relates to an image capturing apparatus and an image capturing method for sending out time-varying image data onto a network.

2. Description of the Related Art

Recently, the Internet has widely spread, and transmission of information by WWW (World Wide Web) and the like is commonly performed. In such a situation, there has appeared an image capturing apparatus provided with a function of capturing an image in real time and transmitting the picture (a time-varying image) onto a network. Network Camera Server VB-C10 by Canon Inc. is a good example thereof.

When it is attempted to provide services for users via a network, there may be a case where encoded data which have been processed with multiple different parameters are requested, for one input image taken at some time point, because users' requests are varied. As a first example of an image processing apparatus attempting to respond to such requests, there exists an image processing apparatus attempting to respond to the requests by having multiple encoding processing units (for example, Japanese Patent Laid-Open No. 2003-309853 (p. 19; FIGS. 1 and 6; p. 20; FIG. 3)).

Thus, in the case of attempting to respond to multiple image processing requests by having multiple encoding processing units, the content of services which can be provided is restricted by the number of the processing units. By increasing the number of the processing units, the restriction may be loosened. However, a network camera server and the like, which has an image capturing function, are generally required to be small-sized, and the number of processing units which can be implemented therein is restricted by the board/chip area or the heat value thereof. Therefore, there is a problem that the number of processing units is actually limited.

Meanwhile, in the case of capturing an image in real time and accumulating images for the purpose of monitoring or delivery, it is never allowed to drop an image inputted from an image capturing apparatus. For example, in the case of acquiring a picture input from a video camera for capturing images at a rate of 30 frames per second, the time allowed for processing any given frame is 1/30 second in principle, which is the time required for inputting one frame image. The time required for inputting one frame image is hereinafter referred to as "one picture period". A system is required to respond to a wide variety of users' requests described above within the picture period. A network camera capable of remotely operating a picture taking unit is required to operate in real-time and have little delay.

As a second example of an image processing apparatus, there exists an image processing apparatus attempting to respond to various users' requests by reading various conversion algorithms stored in a ROM in advance as necessary, and causing a DSP to perform the processing of the algorithms (for example, Japanese Patent Laid-Open No. 06-125411 (p. 8; FIG. 1; p. 10; FIG. 4)).

In this technique, multiple image processing operations are simply performed by the DSP in parallel in a time-sharing manner in accordance with the algorithms, and there is a problem that the processings are not assured to be completed within one picture period.

That is, a prior-art image capturing apparatus that sends out time-varying image data onto a network has a difficulty providing multiple services for users who issue various requests on a network while maintaining a real-time operation.

SUMMARY OF THE INVENTION

The present invention provides an image capturing apparatus which makes it possible to provide multiple services for users who issue various requests on a network while maintaining a real-time nature operation.

According to the present invention, the foregoing problem is solved by providing an image capturing apparatus having: an image capturing unit adapted to acquire image data by capturing a subject; a development unit adapted to develop the image data acquired by the image capturing unit as time-varying image data; an image processing unit adapted to perform image processing of the time-varying image data; a network communication unit adapted to send out the time-varying image data processed by the image processing unit onto a network; and a control unit adapted to control the time-varying image data for which multiple different image processing operations have been performed by the image processing unit, to be outputted to the network communication unit within one picture period, which is the update interval of image data corresponding to one screen and constituting the time-varying image data.

According to the present invention, the foregoing problem is solved by providing an image capturing method comprising the steps of: acquiring image data by capturing an image of a subject; developing the acquired image data as time-varying image data; performing image processing of the time-varying image data; and sending out the time-varying image data for which multiple different types of image processing have been performed onto a network within one picture period, which is an update interval of image data corresponding to one screen and constituting the time-varying image data.

Further features of the present invention will be apparent from the following description of exemplary embodiments with reference to the attached drawings.

BRIEF DESCRIPTION OF THE DRAWINGS

FIG. 20 is a diagram showing the details of the resolution conversion unit in the fifth embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
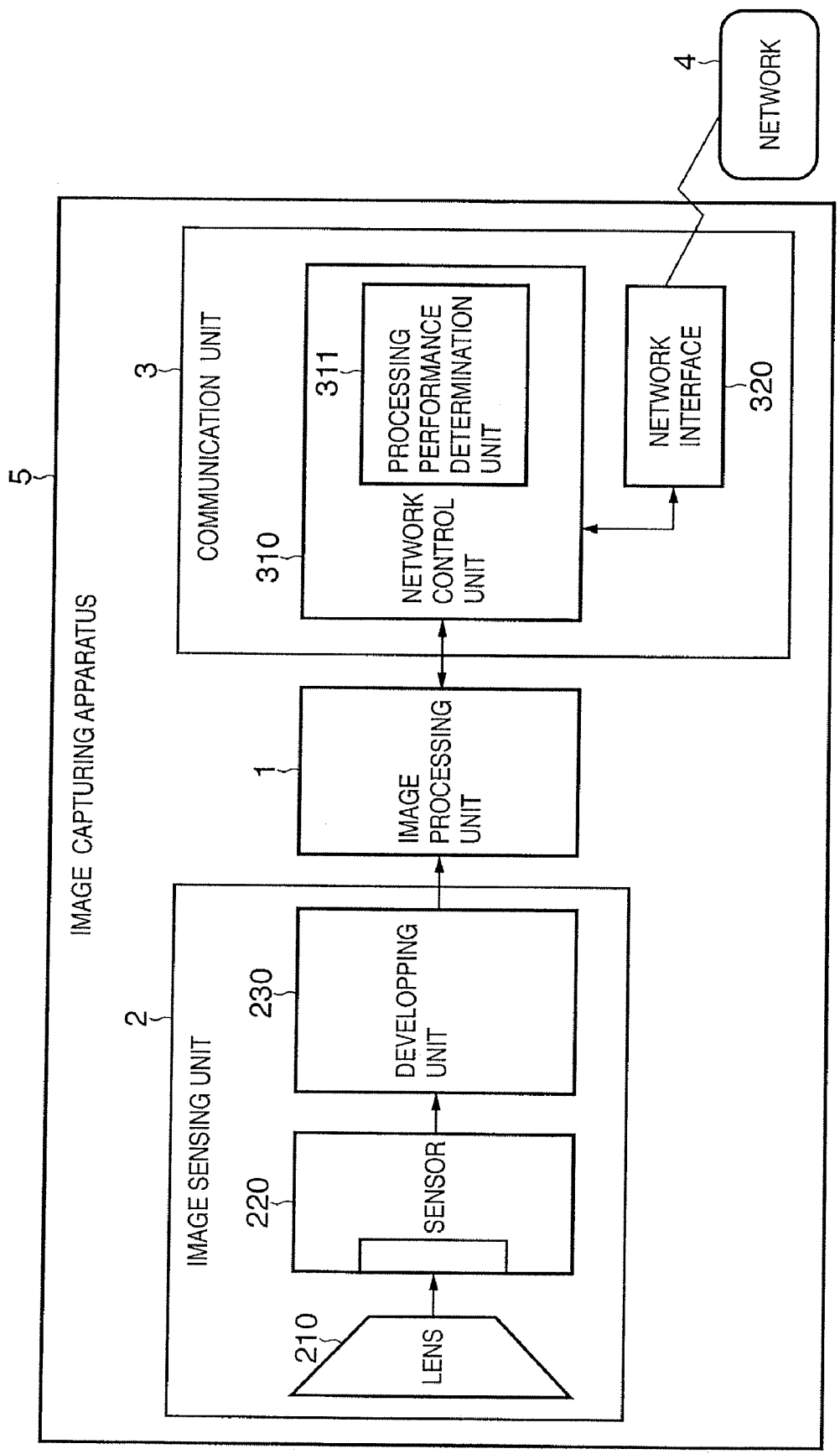
FIG. 1 is a diagram showing the configuration of an image capturing apparatus according to a first embodiment of the present invention.

FIG. 1 is a block diagram showing an image capturing apparatus according to a first embodiment of the present invention.

In FIG. 1, there are mainly three components, that is, an image processing unit 1, an image capturing unit 2 and a communication unit 3, in the image capturing apparatus 5. The image capturing or sensing unit 2 includes a lens 210 which light constituting a picture enters, a sensor 220 for converting light collected by the lens to an electrical signal, and a developing unit 230 for developing the signal obtained from the sensor 220.

The developed signal is given to the image processing unit 1 as image data. Processing such as encoding is performed for the image data there, and then the data is given to the communication unit 3 as encoded data. At the communication unit 3, processing such as packetization is performed for the data depending on the form of a network to which a network control unit 310 sends out the encoded data which has been inputted therein, and then the data is handed over to a network interface 320 as data to be sent. The network interface 320 sends out the data to a network 4 in a form compatible with the form of the network. The network 4 is assumed to be typically a network represented by a wired LAN such as a Ethernet (registered trademark) LAN, a wireless LAN of a type represented by the IEEE802.11b type or a public line network such as an ISDN. The network control unit 310 also includes a processing performance determination unit 311.

In this embodiment, the image processing unit 1, the image capturing unit 2 and the communication unit 3 are described as separate blocks in FIG. 1. However, when this embodiment is configured by hardware, various realization forms are possible, such as a form of realizing these blocks as separate IC's and a form of collecting and realizing some parts of the respective units (for example, the developing unit 230, the image processing unit 1 and the network control unit 310) on one chip. That is, the form is not limited by this embodiment.

Figure 2:
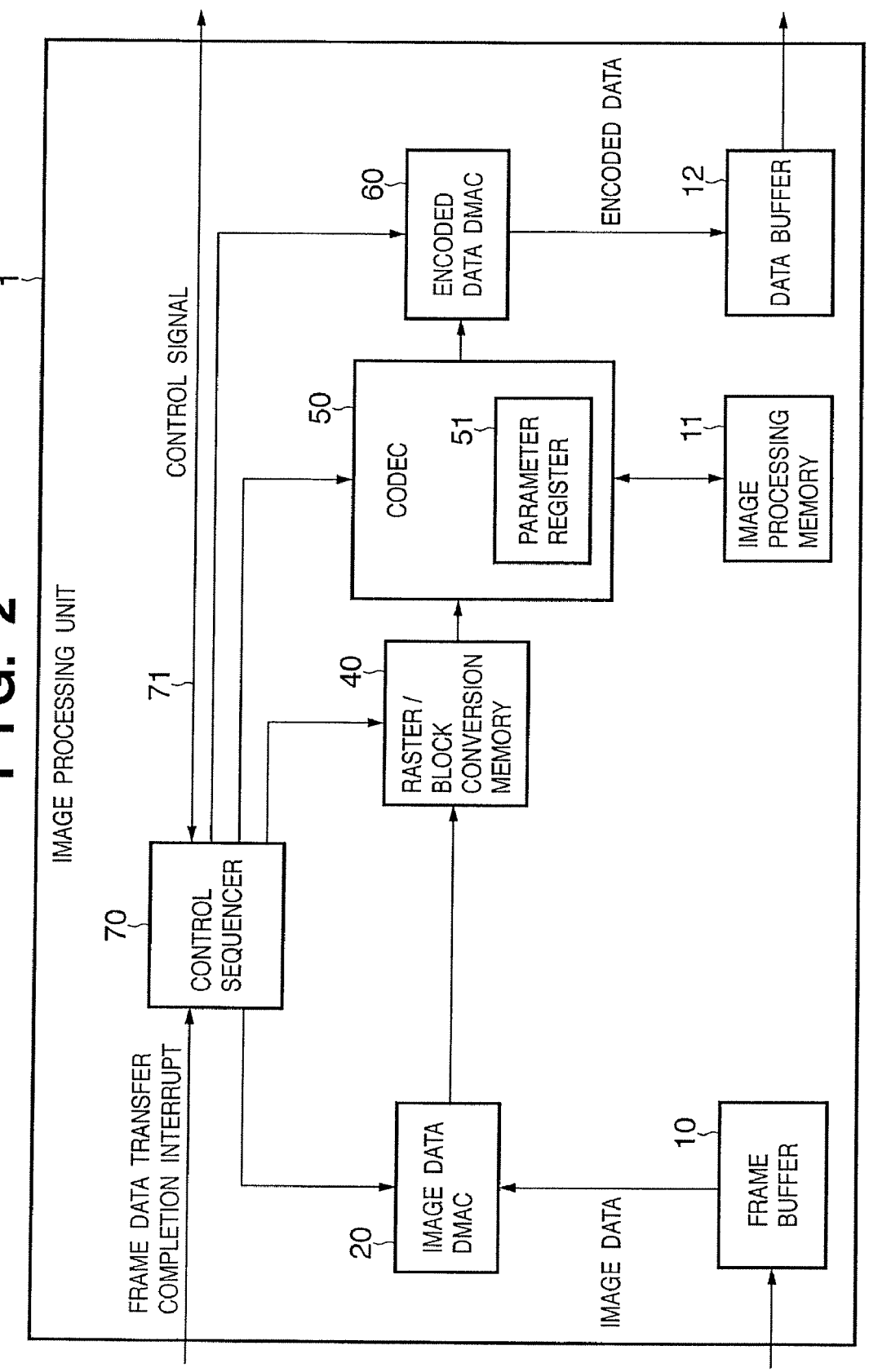
FIG. 2 is a diagram showing the details of an image processing unit in the first embodiment of the present invention.

FIG. 2 is a block diagram showing the detailed configuration of the image processing unit 1. FIG. 2 shows a frame buffer 10, an image data DMAC (direct memory access controller) 20, a raster/block conversion memory 40, a codec 50, an encoded data DMAC 60, a control sequencer 70, an image processing memory 11 and a data buffer 12 in the image processing unit 1. The control sequencer 70 is connected to each of the image data DMAC 20, the raster/block conversion memory 40, the codec 50 and the encoded data DMAC 60 in the image processing unit 1 via a control signal line, and controls each unit. Furthermore, the control sequencer 70 is connected to the developing unit 230 via a frame data transfer completion interrupt signal line and to the communication unit 3 via a control signal line 71 extending between the image processing unit 1 and the communication unit 3, and it mutually exchanges signals with them to control their operation. The codec 50 is connected to the image processing memory 11, and it performs various image processing operations using this memory. Furthermore, the codec 50 has a parameter register 51 inside it, and it is assumed to perform various image processing operations in accordance with a value written in this parameter register 51 by the control sequencer 70.

As for each of the frame buffer 10, the image processing memory 11 and the data buffer 12, when the other components of the image processing unit 1 are realized in one IC, it is possible to arrange each of them as an on-chip memory (for example, as an SDRAM (synchronous DRAM) of SDR (single data rate) or DDR (double data rate)) on the same IC or realize it as a memory device connected to the IC outside the IC. As for the memories also, various configurations are possible, such as arranging each of the memories on a separate memory device and arranging them on the same memory device.

The basic operation of the image capturing apparatus 5 will be described in detail with the use of FIGS. 1 and 2. In FIG. 1, first, image information about light collected by the lens 210 of the image capturing unit 2 is acquired by the sensor 220 as an electrical signal. A CCD image sensor, a CMOS image sensor or the like can be used as this sensor 220. In this embodiment, the sensor 220 is assumed to be a square pixel progressive format CCD. It is assumed that the number of valid pixels thereof is 640×480, a so-called VGA size, and that the sensor is capable of outputting a VGA image of one frame per 1/30 second. That is, one picture period in this embodiment is assumed to be 1/30 second (approximately 33.3 ms). The image data, which is photoelectrically converted and acquired as an electrical signal by the sensor 220, is sequentially read and handed to the developing unit 230. The developing unit 230 performs signal processing of the image data obtained from the sensor 220 to create brightness signals and color difference signals and output them in a form which can be easily processed by subsequent stages. Here, they are assumed to be outputted in the YUV422 format.

The image data converted to the YUV422 format by the developing unit 230 of the image capturing unit 2 are stored in the frame buffer 10 of the image processing unit 1 in frames. The subsequent operation will be described with the use of FIG. 2 and the timing charts in FIG. 3.

Figure 3:
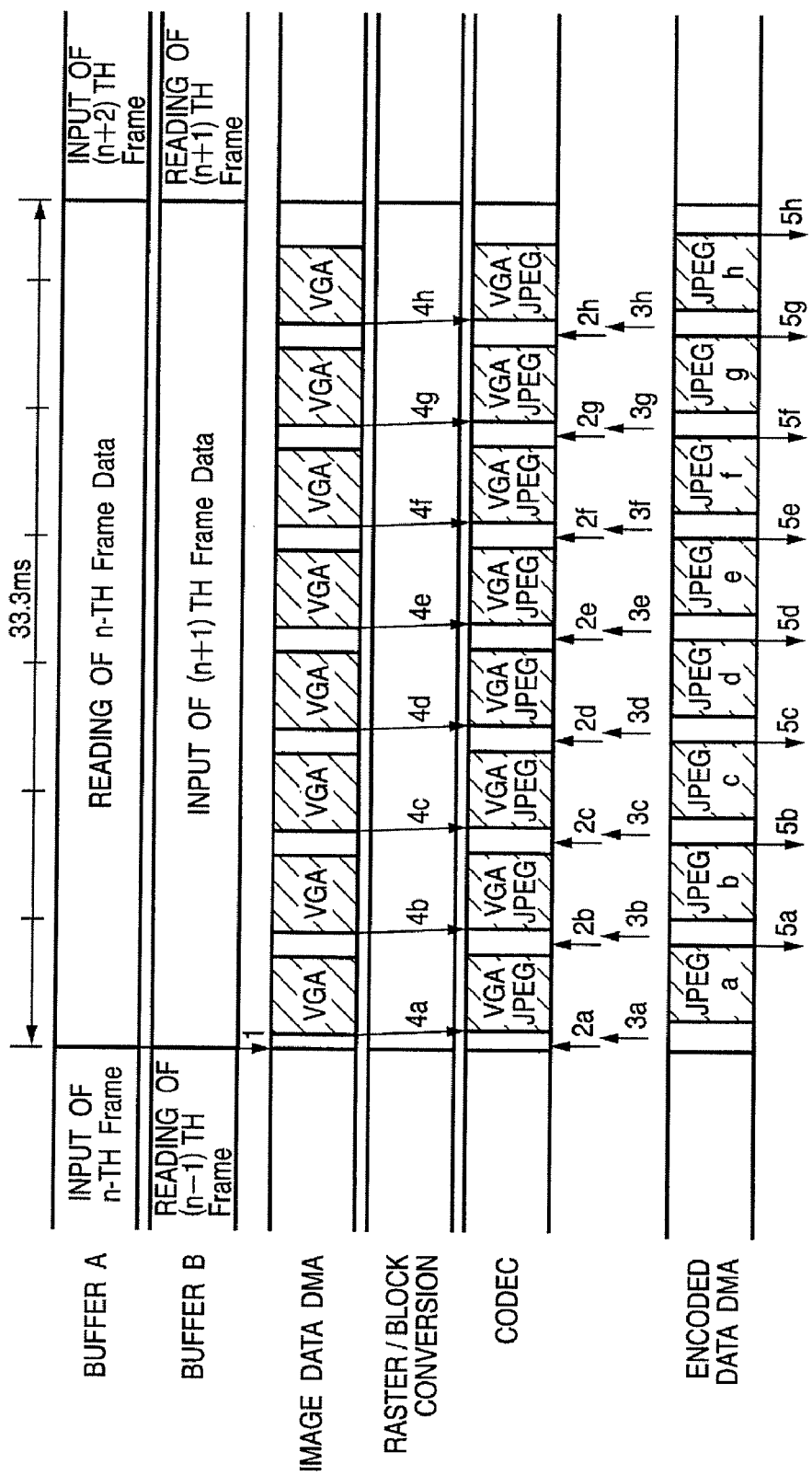
FIG. 3 is a diagram showing the operational flow of the image processing unit in the first embodiment of the present invention.

Data outputted from the developing unit 230 is stored in the frame buffer 10 in frames. As shown in FIG. 3, the inside of the frame buffer 10 is configured in a double buffer form, and image data of the n-th frame and the (n+1)th frame are stored in different areas (buffers A and B). Therefore, for example, in the case where the image data of the n-th frame is accumulated in the buffer A during some picture period, it is possible to accumulate the image data of the (n+1)th frame in the buffer B while the image data of the n-th frame is being read and used within the next picture period.

Now, suppose that accumulation of the n-th frame in the buffer A of the frame buffer 10 has just been completed. Then, frame data transfer completion interrupt from the developing unit 230 to the control sequencer 70 occurs (arrow 1 in FIG. 3).

In response to the frame data transfer completion interrupt, the control sequencer 70 first sets a parameter for specifying what processing should be performed by the codec procession unit, in the parameter register 51 of the codec 50 (arrow 2a in FIG. 3). In this embodiment, this codec is assumed to perform JPEG compression processing. In this case, a typical example of the compression parameter is a Q value indicating the degree of compression of a picture.

When setting of the parameter in the parameter register 51 ends, the control sequencer 70 then instructs the image data DMAC 20 to read the image data of the n-th frame from the buffer A of the frame buffer 10 and start transfer for providing the data for the codec 50 (arrow 3a in FIG. 3).

Receiving the instruction, the image data DMAC 20 sequentially reads the image data of the n-th frame from the buffer A of the frame buffer 10 and provides the data for the raster/block conversion memory 40. In order to perform JPEG processing by the codec 50, it is necessary to provide data in blocks of 8×8 pixels. Therefore, the data is converted to that form by the raster/block conversion memory 40 and then provided for the codec 50 (arrow 4a in FIG. 3).

The codec 50 performs JPEG compression of the image data given from the raster/block conversion memory 40, in accordance with the parameter value set in the parameter register 51 to generate encoded data JPEGa. It is assumed in this embodiment that compression is performed with the Q value=Qa in this first compression. The encoded data compressed by the codec 50 is sequentially handed over to the encoded data DMAC 60, and the encoded data DMAC 60 transfers the encoded data in predetermined units to the data buffer 12. When transfer of all the encoded data created from the image data of the n-th frame is completed, the control sequencer 70 sends out an encoded data transfer completion interrupt notification to the communication unit 3 (arrow 5a in FIG. 3). This interrupt notification is communicated via a control signal transmitted on the control signal line 71 between the image processing unit 1 and the communication unit 3.

At the communication unit 3, in response to the encoded data transfer completion interrupt notification, the network control unit 310 reads the encoded data from the data buffer 12, performs processing such as packetization depending on the form of a network to which the encoded data is to be sent out, and hands the data to the network interface 320. The network interface 320 sends out the data to the network 4 in a form compatible with the form of the network 4.

Figure 4:
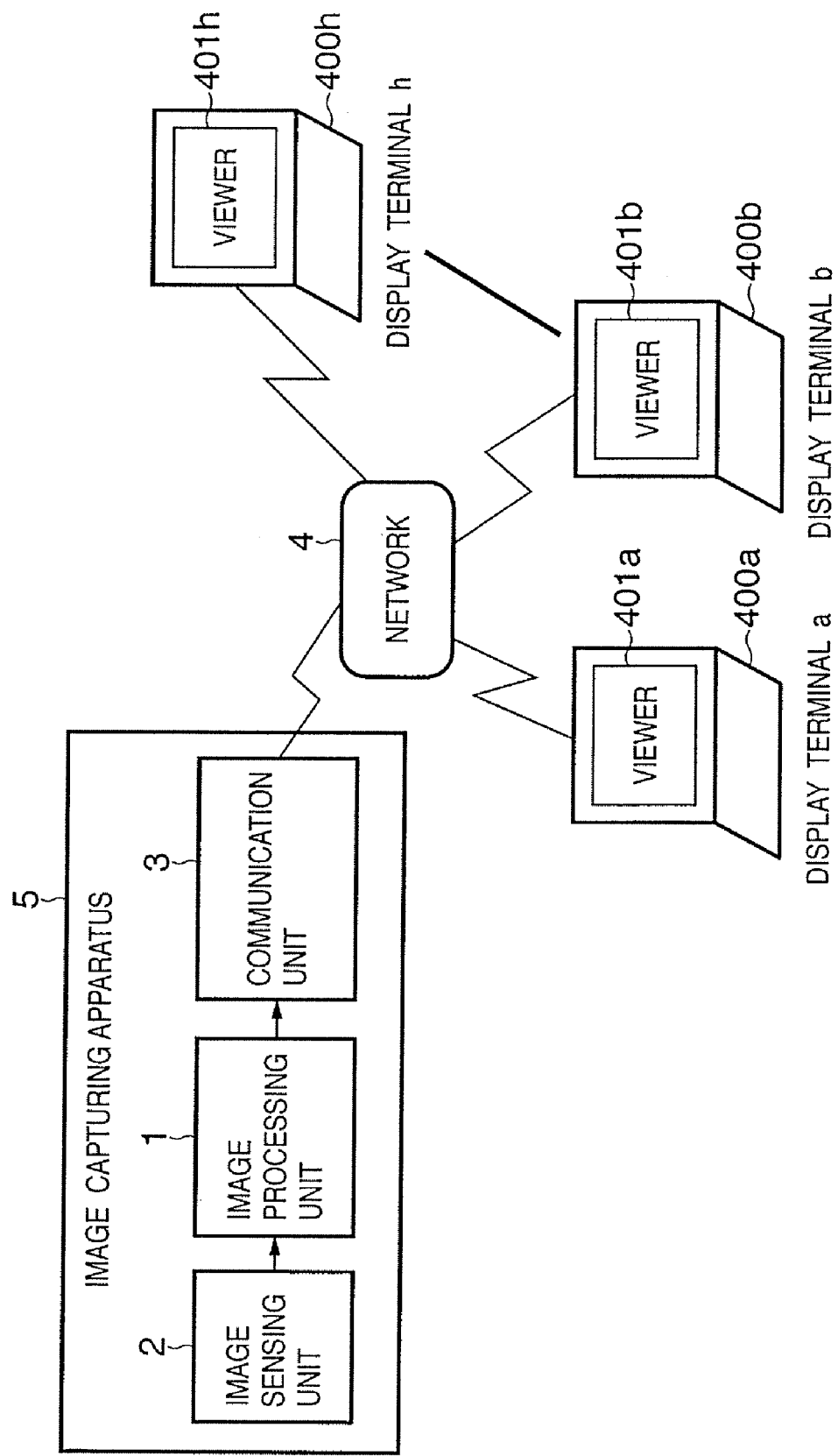
FIG. 4 is a diagram showing a configuration example of a system using the image capturing apparatus according to the first embodiment of the present invention.

FIG. 4 is a diagram showing a configuration example of a system using the image capturing apparatus 5 according to this embodiment.

A display terminal is connected to the network 4, and a user displays an image taken by the image capturing apparatus 5 with the use of a viewer on the terminal. In FIG. 4, there exist a total of eight display terminals 400a to 400h (only five of which, 400a, 400b, and 400h are shown). The display terminals 400a, 400b, 400h include viewers 401a, 401b, 401h, respectively. The unillustrated terminals 400c-400g include unillustrated viewers 401c-401g, respectively. It is assumed that viewers 401a to 401h operate on their respective display terminals, and each user can use each of them.

In the system as shown in FIG. 4, the network environments to which the users are connected, the image qualities required by the users and the like vary. If the image qualities required by the users can be realized with the same parameter as that given to the parameter register 51 of the codec 50, it is possible to, when the network control unit 310 of the communication unit 3 of the image capturing apparatus 5 sends out data to the terminal of each user, service the picture data to the multiple users by copying the same encoded data and handing over the copied data to the network interface 320.

However, in the case where each user requests a different image quality parameter, the above situation cannot be realized only by copying the data as described above. Furthermore, in order to smoothly display a time-varying image on the user's display terminal without dropping frames, it is necessary to perform image processing requested by each user within one picture period (1/30 second (approximately 33.3 ms) in this embodiment). A description will be provided below on the operation of the image capturing apparatus 5 performed in such a case, with the use of FIGS. 1 to 4. Since the basics of the operation have already been described with the use of FIGS. 2 and 3, a description will be provided on the operation performed for responding to requests from multiple users and a flow of a series of operations in response to the operation.

Now, in FIG. 4, it is assumed that the users using the display terminals 400a to 400h require JPEG images having Q values indicated by Q=Qa to Qh, respectively. The processing performance determination unit 311 existing in the network control unit 310 of the communication unit 3 determines whether or not it is possible to cause the image processing unit to process all the content of the processings requested by the respective terminals within one picture period. In this embodiment, a table for evaluating the processing performance of the image processing unit based on the processing content (such as the kind of processing, the data amount to be handled and the degree of compression) is referred to in advance. Depending on the result, it is determined that to perform processing of JPEG images having Q values indicated by Q=Qa to Qh does not cause a problem and an instruction to perform the processing is given to the image processing unit. This instruction is communicated to the control sequencer 70 of the image processing unit 1 with the use of the control signal transmitted on the control signal line 71 between the image processing unit 1 and the communication unit 3 in FIG. 2.

In this embodiment, the processing performance determination unit 311 is assumed to exist in the network control unit 310 of the communication unit 3. However, it is also possible, for example, to arrange it in the image processing unit 1 or implement it as a part of functions incorporated in the control sequencer 70 of the image processing unit 1. Basically, its position is not limited by this embodiment to realize the function.

In the case where the processing performance determination unit 311 is incorporated in the control sequencer 70, the content of processings requested by the respective terminals are communicated to the processing performance determination unit 311 in the control sequencer 70 via a control signal transmitted on the control signal line 71 between the image processing unit 1 and the communication unit 3, through the network control unit 310. The above determination is made with the use of this information. However, in this case, even if the processing performance determination unit 311 has already determined that image processing such as compression processing cannot be accepted any more, a new user request is communicated to the processing performance determination unit 311 in the control sequencer 70 via a control signal transmitted on the control signal line 71 between the image processing unit 1 and the communication unit 3 because the determination unit is inside the control sequencer 70, and a refusal reply to the user request is returned along the same route. Since requests from the users on the network are sent not in synchronization with picture periods, data is also irregularly sent to the control sequencer 70. Consequently, control by the image processing unit 1 may be adversely effected. For example, the control sequencer has to respond to a request made at an unexpected timing.

In the case where the processing performance determination unit 311 exists in the network control unit 310, processing in response to user requests is basically determined within the network control unit 310, and the requests are communicated to the control sequencer 70 via a control signal transmitted on the control signal line 71 between the image processing unit 1 and the communication unit 3 only when it is necessary. It is possible to communicate the data at a constant timing synchronized with a picture period. From the viewpoint of reducing the entire processing load as far as possible by performing only necessary data transmission as described above, it is more desirable that the processing performance determination unit 311 exists in the network control unit 310 of the communication unit 3 as in this embodiment.

In FIG. 3, when image compression processing using a compression parameter Q=Qa ends, and the control sequencer 70 recognizes that transfer completion interrupt for the encoded data JPEGa has been sent out (arrow 5*a* in FIG. 3), the control sequencer 70 checks the parameter for the image processing requested next. Then, as shown in FIG. 3, a parameter Q=Qb to be used for the compression requested next is set in the parameter register 51 of the codec 50 (arrow 2*b* in FIG. 3).

The subsequent operation is similar to that in the case of Q=Qa. When setting of the parameter in the parameter register 51 ends, the control sequencer 70 then instructs the image data DMAC 20 to read the image data of the n-th frame from the buffer A of the frame buffer 10 and start transfer for providing the data for the codec 50 (arrow 3*b* in FIG. 3). Then, receiving the instruction, the image data DMAC 20 sequentially reads the image data of the n-th frame from the buffer A of the frame buffer 10 and provides the data for the raster/block conversion memory 40. The image data is converted to blocks of 8×8 pixels and provided for the codec 50 (arrow 4*b* in FIG. 3).

The codec 50 performs JPEG compression of the image data given from the raster/block conversion memory 40, in accordance with the parameter value set in the parameter register 51 (Q=Qb at this point of time) to generate encoded data JPEGb. The encoded data compressed by the codec 50 is sequentially handed over to the encoded data DMAC 60, and the encoded data DMAC 60 transfers the encoded data in predetermined units to the data buffer 12. When transfer of all the encoded data at the time point of Q=Qb which are created from the image data of the n-th frame is completed, the control sequencer 70 sends out transfer completion interrupt for the encoded data JPEGb at the time point of Q=Qb, to the communication unit 3 (arrow 5*b* in FIG. 3).

At the communication unit 3, in response to the transfer completion interrupt for the encoded data processed at the time point of Q=Qb, the network control unit 310 reads the encoded data from the data buffer 12, and performs address processing and the like so that the encoded data may be sent out to the display terminal 400*b* which has issued the request of processing with Q=Qb. The network interface 320 sends out the data to the display terminal 400*b* via the network 4.

This series of operations are repeated multiple times within one picture period in accordance with different Q values requested by the respective users. In this embodiment, a total of eight times of parameter setting corresponding to Qa to Qh and accompanying image compression processing, which the processing performance determination unit 311 has determined to be realizable within one picture period, is performed within one picture period. As a result, it is possible to perform image compression processing multiple times within one picture period with one codec, without implementing multiple processing units in parallel, and therefore, it is possible to provide multiple services for users on a network who have various requests, while maintaining the real-time nature of the network.

For example, it is possible to smoothly display time-varying images with different qualities on display terminals of multiple users, without dropping frames. Furthermore, since the necessity of implementing multiple processing units in parallel is eliminated, the area of a board or chip can be reduced, and power consumption can be also reduced. As a result, it is possible to provide a small-sized network camera.

Furthermore, especially by the processing performance determination unit 311 making an exact determination, it is possible to effectively utilize the unit performance, such as image compression processing, to the maximum, and it is possible to provide multiple services for more users within one picture period with one codec, while maintaining the real-time nature of the network. Furthermore, by arranging the processing performance determination unit 311 in the network control unit 310, it is possible to realize the above functions while further reducing internal data communication, thereby enhancing the entire processing performance and reducing power consumption.

Second Embodiment

In the first embodiment, the Q value of image processing operations requested by users are different. However, according to an another aspect, there may be a case where image processing requested by users is not limited to the Q value. Such a case will be described with the use of FIGS. 1, 4, 5 and 7. The same components in FIGS. 1 and 4 in the first embodiment are also used in this embodiment.

In FIG. 1, it is assumed that the sensor 220 of the image capturing unit 2 is an all-pixel reading system CMOS sensor, and that the number of valid pixels thereof is 1600×1200, a so-called UXGA size in this embodiment. It is assumed that the pixels are square pixels, and that an UXGA image corresponding to one frame can be outputted every 1/30 second. That is, one picture period in this embodiment is assumed to be 1/30 second (approximately 33.3 ms).

Figure 5:
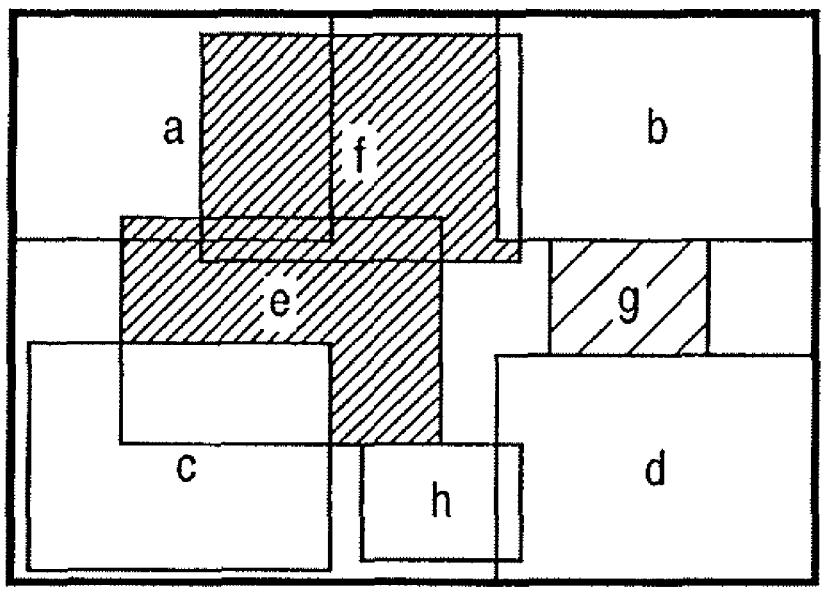
FIG. 5 is a diagram showing field angles and resolutions of images requested by the viewer side, in a second embodiment of the present invention.

Under such conditions, each user in FIG. 4 is assumed to set any image area with a size equal to or smaller than the VGA size inside an UXGA image, and clip and use the partial image. FIG. 5 shows an example indicating which part of the image is clipped and used within the UXGA image size.

In FIG. 5, an image area displayed on the viewer 401a of the display terminal 400a in FIG. 4 is denoted by a, and an image area displayed on the viewer 401b of the display terminal 400b is denoted by b. Similarly, the subsequent image areas, image areas c to h, corresponding to the display terminal 400c to terminal 400h, respectively, are shown. Here, the users of the display terminals 400a to 400f use picture data the image size of which is the VGA size (640×480), and the users of the display terminals 400g and 400h use picture data the image size of which is the QVGA size (320×240).

Furthermore, the processing performance determination unit 311 existing in the network control unit 310 of the communication unit 3 determines whether or not it is possible to cause the image processing unit to process all the content of the processing operations requested by the respective terminals within one picture period. In this embodiment, it is assumed it has been determined that to perform clipping processing of all the image areas shown in FIG. 5 and JPEG image processing by the image processing unit with the use of the pictures does not cause a problem, and therefore, a processing instruction is issued to the image processing unit.

In this embodiment, the processing performance determination unit 311 is assumed to exist in the network control unit 310 of the communication unit 3. However, it is also possible, for example, to arrange it in the image processing unit 1 or implement it as a part of functions incorporated in the control sequencer 70 of the image processing unit 1, similarly to the first embodiment. Its position is not limited by this embodiment. However, similarly to the first embodiment, from the viewpoint of reducing the entire processing load as far as possible by performing only necessary data transmission as described above, it is more desirable that the processing performance determination unit 311 exists in the network control unit 310 of the communication unit 3 as in this embodiment.

On these assumptions, the operation of the image processing unit 1 in this embodiment will be described with the use of FIGS. 6 and 7, with reference to FIG. 1 and FIGS. 4 and 5.

Figure 6:
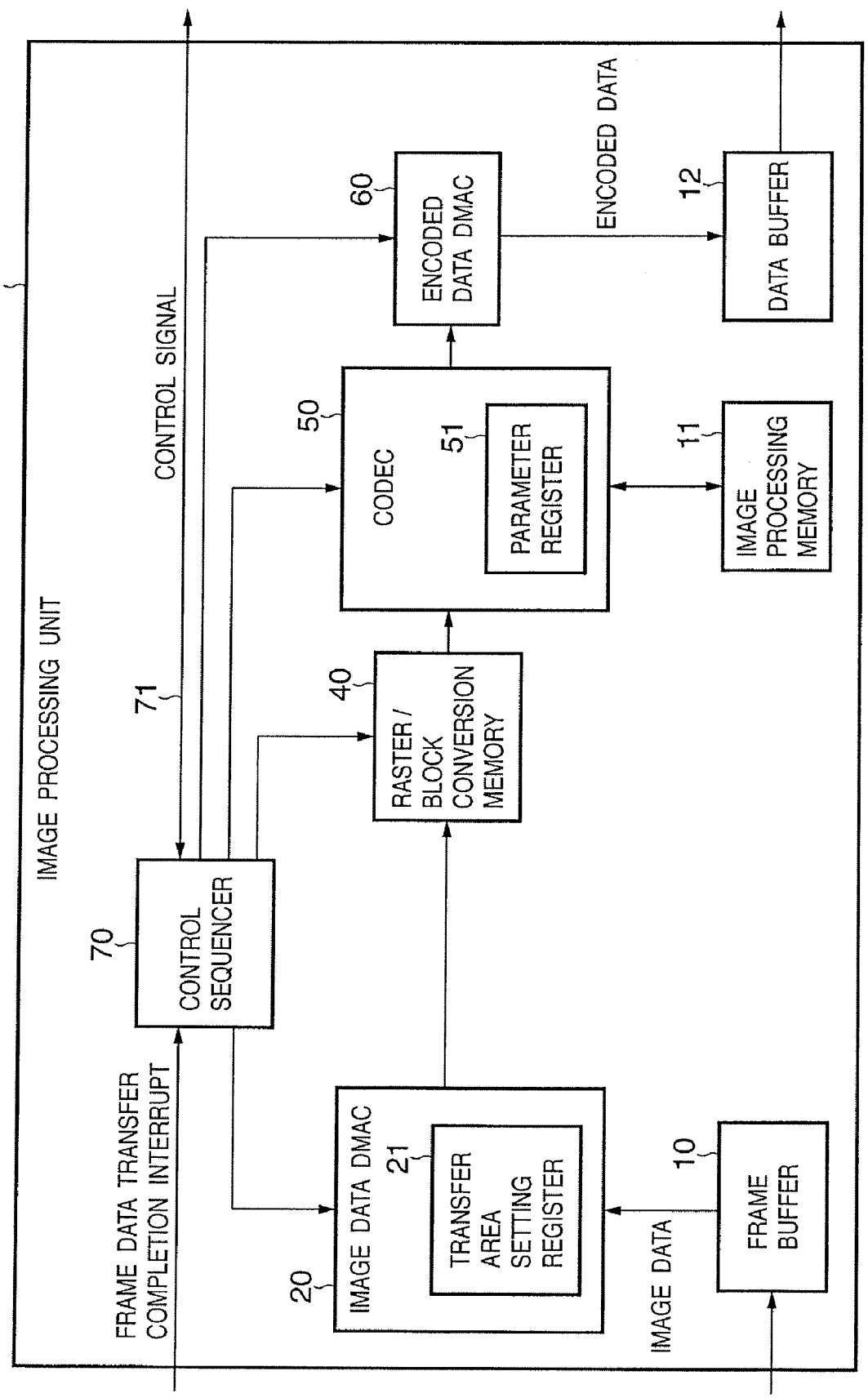
FIG. 6 is a diagram showing the details of an image processing unit in the second embodiment of the present invention.

In FIG. 6, UXGA-size image data outputted from the developing unit 230 is stored in the frame buffer 10 in frames. As shown in FIG. 7, the inside of the frame buffer 10 is configured in a double buffer form, and image data of the n-th frame and the (n+1)th frame are stored in different areas (buffers A and B).

Suppose that the accumulation of the data of the n-th frame in the buffer A of the frame buffer 10 has just been completed. Then, frame data transfer completion interrupt from the developing unit 230 to the control sequencer 70 occurs (arrow 1 in FIG. 7).

In response to the frame data transfer completion interrupt, the control sequencer 70 first sets a parameter for specifying what processing should be performed by the codec procession unit, in the parameter register 51 of the codec 50 (arrow 2a in FIG. 7), similarly to the first embodiment. In this embodiment, this codec is assumed to perform JPEG compression processing. In this case, a typical example of the compression parameters is a Q value indicating the degree of compression of a picture. It is assumed that Q=Qa requested by the display terminal 400a is set at this time point.

Figure 7:
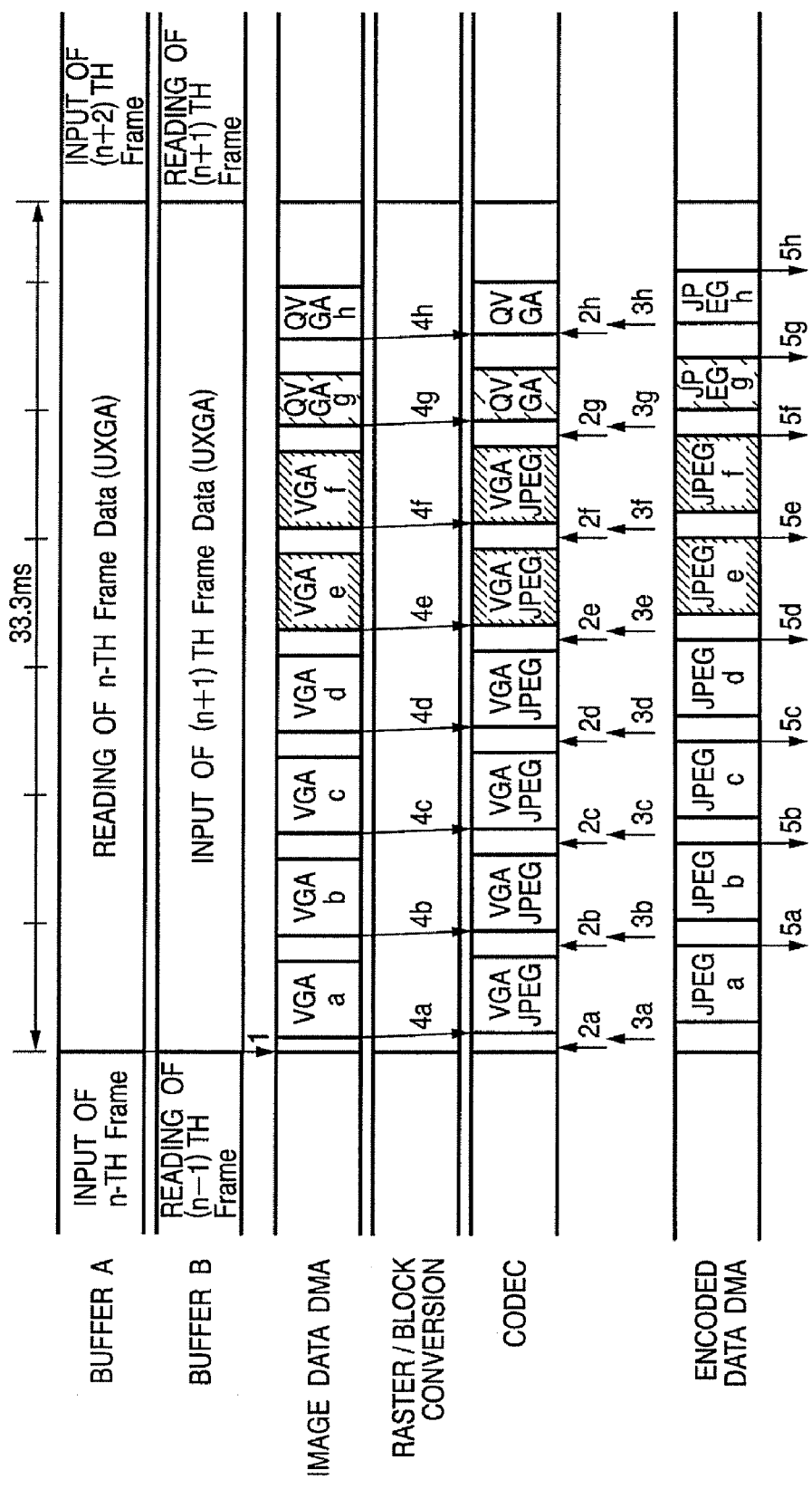
FIG. 7 is a diagram showing the operational flow of the image processing unit in the second embodiment of the present invention.

Then, the control sequencer 70 instructs the image data DMAC 20 to read the image data of the n-th frame from the buffer A of the frame buffer 10 and start transfer for providing the data for the codec 50 (arrow 3a in FIG. 7). In this case, the control sequencer 70 sets an area parameter for specifying which area should be read from the UXGA image data accumulated in the frame buffer 10 and given to the codec 50, for a transfer area setting register 21 of the image data DMAC 20.

It is assumed that this area parameter has been requested by each of the display terminals 400a to 400h on the network to the control sequencer 70 of the image processing unit 1 with the use of the control signal line 71 between the image processing unit 1 and the communication unit 3 in FIG. 6. At this time point, coordinate data indicating the starting position of data to be given to the codec 50 and data indicating the image size (VGA) are given to the control sequencer 70 so that a VGA-size image requested by the display terminal 400a (the area a in FIG. 5) is indicated thereby, and the control sequencer 70 sets transfer area information determined from these data, for the transfer area setting register 21 as an area parameter.

Receiving the specification of the area and the size, the image data DMAC 20 sequentially reads image data of the specified area of the n-th frame from the buffer A of the frame buffer 10, and provides the data for the raster/block conversion memory 40. The raster/block conversion memory 40 converts the data to 8×8 blocks and provides the blocks for the codec 50 (arrow 4a in FIG. 7).

The codec 50 performs JPEG compression of the image data given from the raster/block conversion memory 40, in accordance with the parameter value (Q=Qa) set in the parameter register 51 to generate encoded data JPEGa. The encoded data compressed by the codec 50 is sequentially handed over to the encoded data DMAC 60, and the encoded data DMAC 60 transfers the encoded data in predetermined units to the data buffer 12. When transfer of all the encoded data created from the image data constituting the area in the n-th frame, specified by the display terminal 400a is completed, the control sequencer 70 sends out an encoded data transfer completion interrupt notification to the communication unit 3 (arrow 5a in FIG. 7). This interrupt notification is communicated via a control signal line 71 between the image processing unit 1 and the communication unit 3.

At the communication unit 3, in response to the encoded data transfer completion interrupt notification, the network control unit 310 reads the encoded data from the data buffer 12, performs processing, such as packetization, depending on the form of a network to which the encoded data is to be sent out, and hands the data to the network interface 320. The network interface 320 sends out the data to the network 4 in a form compatible with the form of the network 4, with the display terminal 400a as the destination. The display terminal 400a develops the received data and displays it on the viewer 401a as VGA-size data.

In FIG. 7, when image compression processing using the area parameter and the compression parameter Q=Qa for the display terminal 400a ends, and the control sequencer 70 recognizes that transfer completion interrupt for the encoded data JPEGa has been sent out (arrow 5a in FIG. 7), the control sequencer 70 checks the parameter for the image processing requested next. Then, as shown in FIG. 7, the parameter Q=Qb to be used for the compression requested next is set in the parameter register 51 of the codec 50 (arrow 2*b* in FIG. 7).

Then, the control sequencer 70 instructs the image data DMAC 20 to set the part data and a corresponding size that should be read in the transfer area setting register 21 of the image data DMAC 20 based on the specification by the display 400*b*, when reading the image data of the n-th frame from the buffer A of the frame buffer 10, and to start transfer for providing the data for the codec 50 (arrow 3*b* in FIG. 7). The subsequent operation is similar to that performed for the display terminal 400*a*.

This series of operations are repeated multiple times within one picture period in accordance with different parameters (such as image areas and Q values) requested by the respective users. In this embodiment, a total of eight times of parameter setting and accompanying image compression processing operations are performed within one picture period, based on the specification of different clipping positions, sizes and compression parameters, as shown in FIG. 5. Thereby, it is possible to perform image compression processing of multiple areas within one picture period with one codec, and therefore, it is possible to provide multiple services for users on a network who have various requests, while maintaining the real-time nature of the network. Furthermore, it is possible to create multiple partial area images from one high-resolution image by specifying arbitrary positions and arbitrary sizes and perform image processing using the multiple partial area images within one picture period.

Third Embodiment

In the first and second embodiments, a description has been provided on a case where an image with the same resolution as a taken original image is handled. However, a case is also conceivable where it is desired to use a picture with the same field angle as a taken original image, on a small screen display by lowering the resolution.

Such a case will be described with reference to FIGS. 1 and 4 and FIGS. 8 to 11. The same components in FIGS. 1 and 4 in the first embodiment are also used in this embodiment. In this embodiment, similarly to the second embodiment, it is assumed that the sensor 220 of the image capturing unit 2 in FIG. 1 is an all-pixel reading system CMOS sensor, and that the number of valid pixels is 1600×1200, a so-called UXGA size. It is assumed that the pixels are square pixels, and that an UXGA image corresponding to one frame can be outputted every 1/30 second. That is, one picture period in this embodiment is assumed to be 1/30 second (approximately 33.3 ms).

Figure 8:
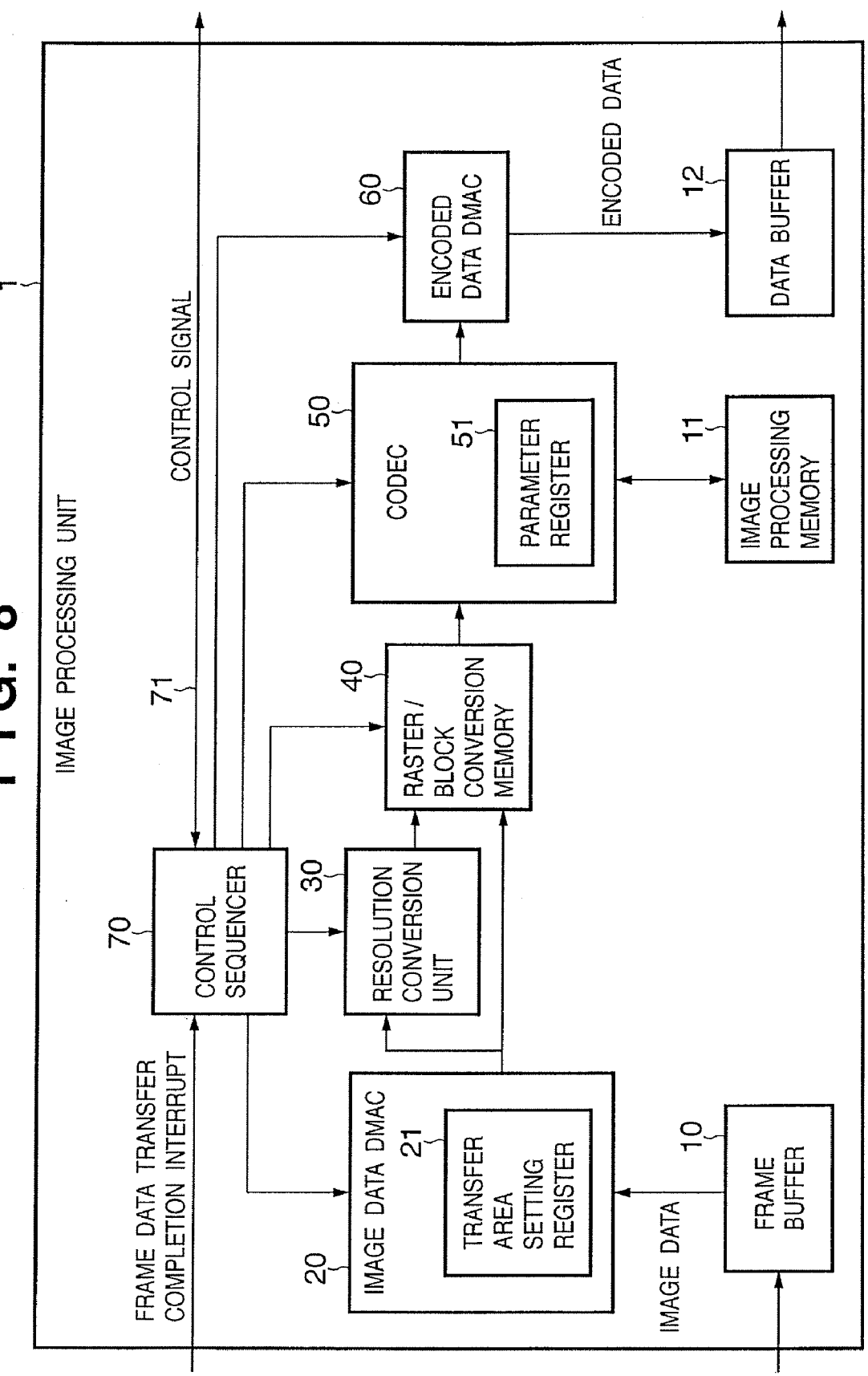
FIG. 8 is a diagram showing the details of an image processing unit in a third embodiment of the present invention.

FIG. 8 is a diagram showing the configuration in the case where a resolution conversion unit 30 exists in the image processing unit 1. In comparison with FIG. 6 in the second embodiment, the data path between the image data DMAC 20 and the raster/block conversion memory 40 is branched into two data paths, and a resolution conversion unit is positioned on one of them. The control sequencer 70 switches the data paths as necessary to provide data through the resolution conversion unit 30.

Figure 9:
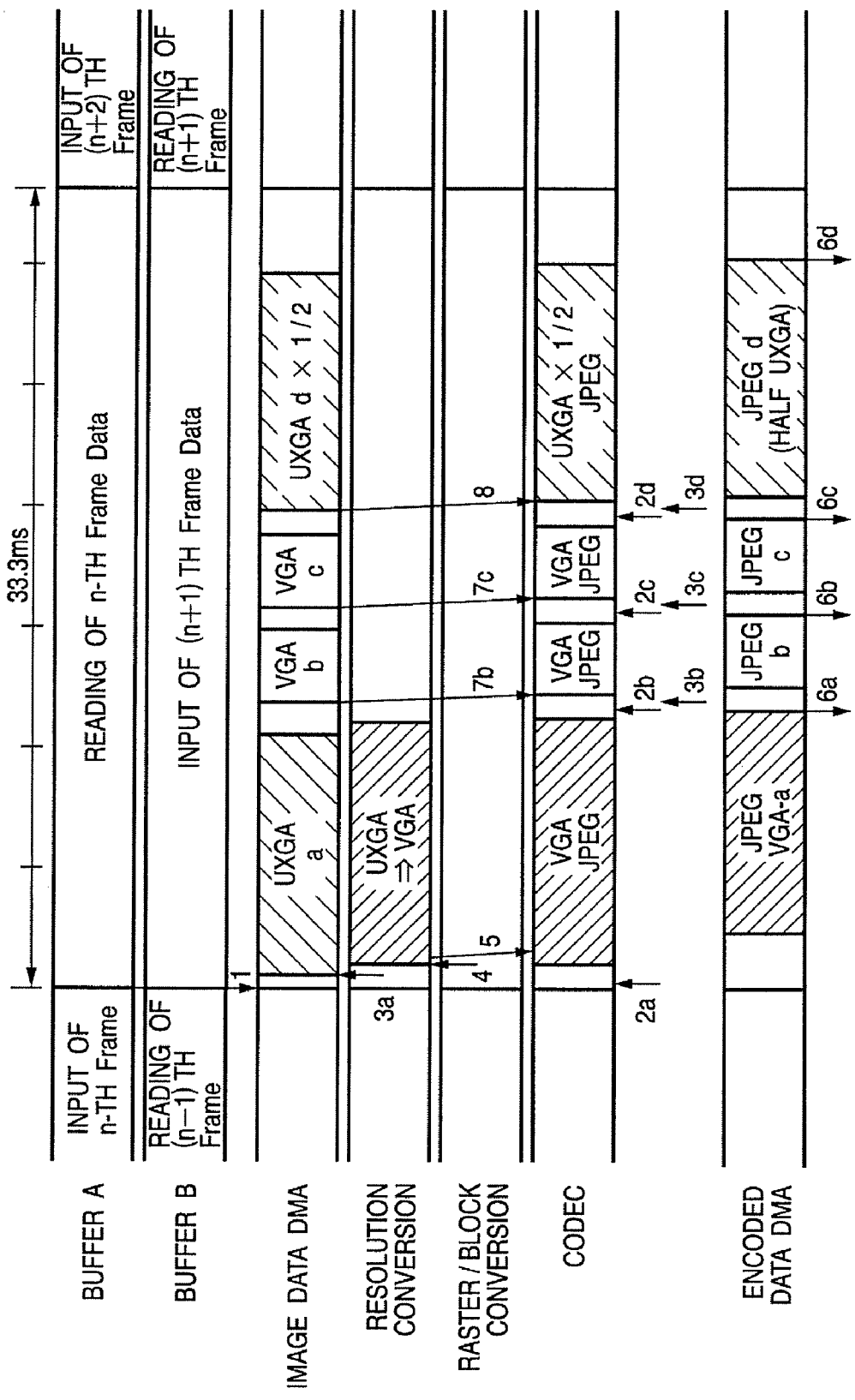
FIG. 9 is a diagram showing the operational flow of the image processing unit in the third embodiment of the present invention.
Figure 10:
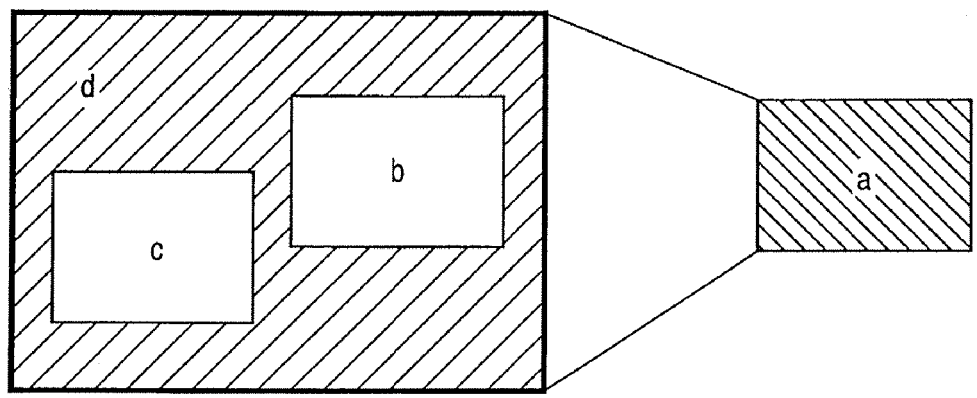
FIG. 10 is a diagram showing field angles and resolutions of images requested by the viewer side, in the third embodiment of the present invention.

FIG. 9 is a diagram showing the operation of the image processing unit in this embodiment, and FIG. 10 is a diagram showing field angles and resolutions requested in this embodiment.

As seen from FIG. 10, it is assumed in this embodiment that data obtained by converting UXGA-size data to a VGA-size image with the same field angle and compressing the image (data a), data obtained by compressing a VGA-size image clipped from the UXGA-size original data (data b and c), and data obtained by directly compressing the UXGA-size image (data d) are requested. Here, the data a to d correspond to requests from the terminals 400*a* to 400*d* in FIG. 4, respectively.

In FIG. 8, UXGA-size image data outputted from the developing unit 230 is stored in the frame buffer 10 in frames. As shown in FIG. 9, the inside of the frame buffer 10 is configured in a double buffer form, and image data of the n-th frame and the (n+1)th frame are stored in different areas (buffers A and B).

Now, suppose that accumulation of the n-th frame in the buffer A of the frame buffer 10 has just been completed. Then, frame data transfer completion interrupt from the developing unit 230 to the control sequencer 70 occurs (arrow 1 in FIG. 9).

In response to the frame data transfer completion interrupt, the control sequencer 70 first sets a parameter for specifying what processing should be performed by the codec procession unit, in the parameter register 51 of the codec 50 (arrow 2*a* in FIG. 9), similarly to the second embodiment. In this embodiment, this codec is assumed to perform JPEG compression processing. In this case, a typical example of the compression parameters is a Q value indicating the degree of compression of a picture. It is assumed that Q=Qa requested by the display terminal 400*a* is set at this time point.

Then, the control sequencer 70 instructs the resolution conversion unit 30 to perform resolution conversion of UXGA-size image data inputted from the image data DMAC 20 to the VGA size (the timing is not shown). As for which size is to be obtained by the resolution conversion, it is assumed that a request has been made by the display terminal 400*a* on the network to the control sequencer 70 of the image processing unit 1 with the use of a control signal line 71 between the image processing unit 1 and the communication unit 3 in FIG. 8.

Then, the control sequencer 70 instructs the image data DMAC 20 to read the image data of the n-th frame from the buffer A of the frame buffer 10 and start transfer for providing the data for the codec 50 via the resolution conversion unit 30 (arrow 3*a* in FIG. 9). At this time point in this embodiment, since it is necessary to read all the UXGA data and input the data into the resolution conversion unit 30, an area parameter is set in the transfer area setting register 21 so that such input is performed. In this case, if a partial area in the UXGA area is specified and set in the transfer area setting register 21, then it is possible to convert the resolution of an image corresponding to the partial area by reading the data in the area and giving it to the resolution conversion unit 30, though this is not especially described in this embodiment.

When data transfer from the frame buffer 10 to the resolution conversion unit 30 is started by the image data DMAC 20 as described above, the resolution conversion unit 30 starts resolution conversion from UXGA to VGA (arrow 4 in FIG. 9). Then, image data for which resolution has been converted is sequentially provided for the raster/block conversion memory 40 in the order of being converted. The raster/block conversion memory unit converts the data to 8×8 blocks and provides the blocks for the codec 50 (arrow 5 in FIG. 9).

The codec 50 performs JPEG compression of the image data given from the raster/block conversion memory 40, in accordance with the parameter value (Q=Qa) set in the parameter register 51 to generate encoded data. In comparison with encoding processing of other VGA data, more time is required to encode the data a. This is because the processing of reading UXGA data to be the original data of VGA data from the frame buffer 10 and converting the resolution to generate VGA data is a factor for determining the entire processing speed in this embodiment.

The encoded data compressed by the codec 50 is sequentially handed over to the encoded data DMAC 60, and the encoded data DMAC 60 transfers the encoded data in predetermined units to the data buffer 12. When transfer of all the encoded data constituting the VGA data is completed, the control sequencer 70 sends out an encoded data transfer completion interrupt notification to the communication unit 3 (arrow 6a in FIG. 9). This interrupt notification is communicated via a control signal line 71 between the image processing unit 1 and the communication unit 3.

At the communication unit 3, in response to the encoded data transfer completion interrupt notification, the network control unit 310 reads the encoded data from the data buffer 12, performs processing, such as packetization, depending on the form of a network to which the encoded data is to be sent out, and hands the data to the network interface 320. The network interface 320 sends out the data to the network 4 in a form compatible with the form of the network 4, with the display terminal 400a as the destination. The display terminal 400a develops the received data and displays it on the viewer 401a as VGA-size data.

In FIG. 9, when resolution conversion and image compression processing using the compression parameter of Q=Qa for the display terminal 400a end, and the control sequencer 70 recognizes that transfer completion interrupt for the encoded data JPEG: VGA-a has been sent out (arrow 6a in FIG. 9), the control sequencer 70 checks the parameter for the image processing requested next. Then, Q=Qb is set in the parameter register 51 of the codec 50 here (arrow 2b in FIG. 9).

Then, the control sequencer 70 instructs the image data DMAC 20 to set transfer area information determined by the starting coordinates and the size (VGA) of the VGA data denoted by b in FIG. 10 in the transfer area setting register 21 of the image data DMAC 20 based on the specification by the display terminal 400b, when reading the image data of the n-th frame from the buffer A of the frame buffer 10, and then start transfer for providing the data for the codec 50 (arrow 3b in FIG. 9). The subsequent operation is similar to the processing performed for the display terminal 400a in the second embodiment, and the operation is similarly performed for compression of the clipped VGA image data c for the terminal 400c.

In FIG. 9, when image compression processing for the display terminal 400c ends, and the control sequencer 70 recognizes that transfer completion interrupt notification for the encoded data JPEGc has been sent out (arrow 6c in FIG. 9), the control sequencer 70 checks the parameter for the image processing requested next. Here, the operation requested next is to perform JPEG compression of the UXGA-size image data d with the resolution unchanged and send it to the terminal 400d.

However, it imposes a heavy load on the entire system, especially on the codec processing to directly compress and sent the UXGA image data. Therefore, in this embodiment, only half of the UXGA image is processed within the one picture period, and the remaining half is processed in the next picture period. This determination is made in advance by the processing performance determination unit 311 existing in the network control unit 310 of the communication unit 3. If the condition is acceptable, then it is notified to the user of the display terminal 400d that a service is to be started. The user of the display terminal 400d who requests the picture is assumed to have accepted the condition.

The procedure for the processing is similar to the processing for other images. That is, setting of the parameter Q=Qd to be used for compression in the parameter register 51 of the codec 50 (arrow 2d in FIG. 9) is made first, and then an instruction to make setting in the transfer area setting register 21 and start transfer of the image data is given to the image data DMAC 20 (arrow 3d in FIG. 9). Then, when transfer of the image data is started (arrow 8 in FIG. 9), the codec 50 starts JPEG compression using the specified parameter. When half of the UXGA data has been compressed and transferred to the data buffer 12, the control sequencer 70 sends out the transfer completion interrupt notification for the encoded data JPEGd to the data buffer communication unit 3 (arrow 6d in FIG. 9).

By terminating the processing once and handing the processing to the communication unit 3 before completion of data corresponding to one sheet as described above, it is possible to perform delivery while equalization of the load in data communication is taken into consideration on the communication unit 3 side.

Figure 11:
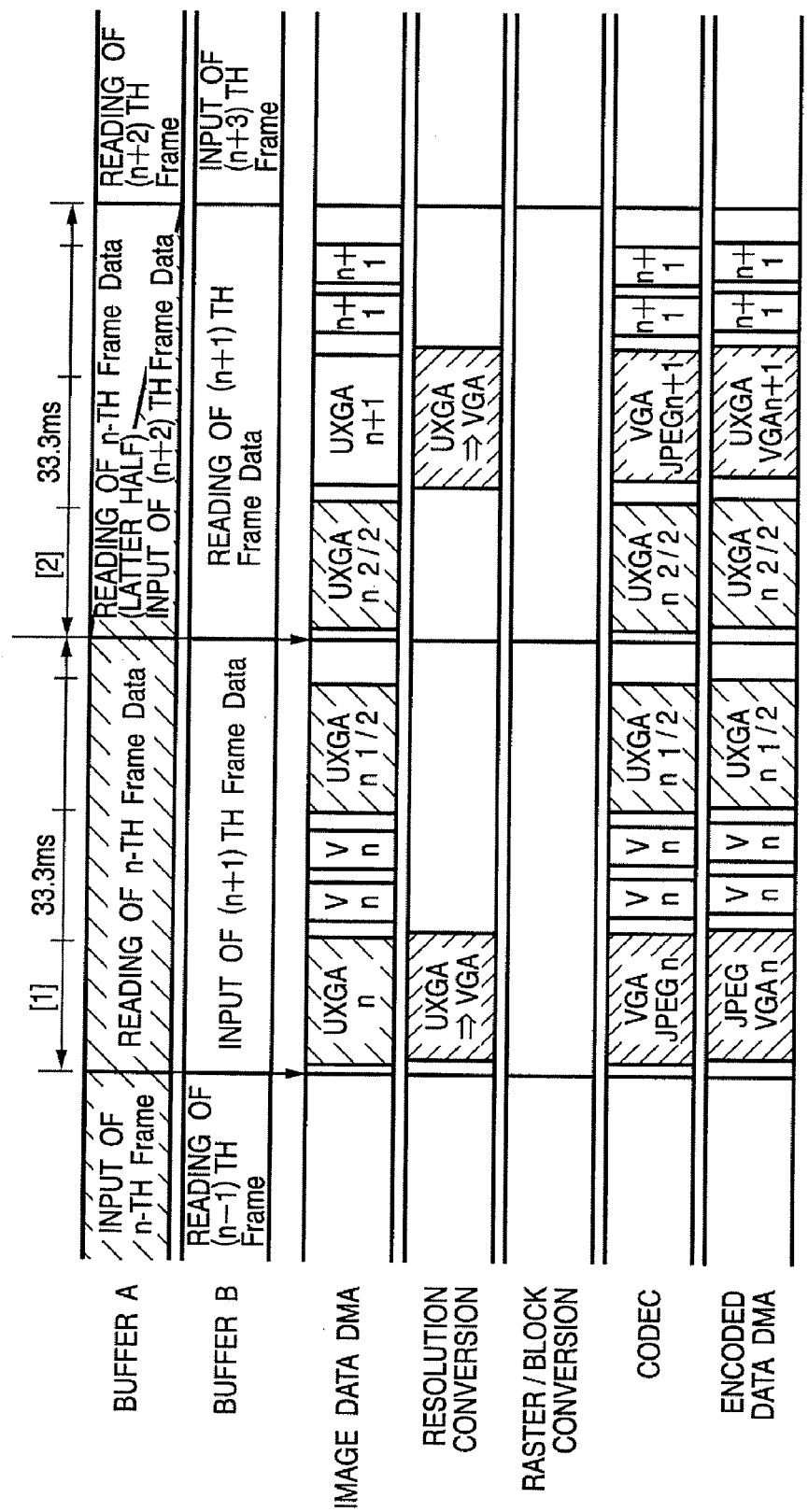
FIG. 11 is a diagram showing the operational flow of the image processing unit for successive two picture periods, in the third embodiment of the present invention.

FIG. 11 is a diagram showing the operation performed in the case of performing JPEG compression of a UXGA-size image using successive two picture periods.

The content corresponding to a picture period [1] is the same as that shown in FIG. 9. When half of JPEG-compression of UXGA-size data is performed in the latter half of the picture period [1], it is necessary to perform the remaining JPEG-compression of the UXGA-size data in a subsequent picture period [2]. In this case, the image data used for the compression is that of the n-th frame, and the n-th frame image data is stored in the buffer A between the double buffers constituting the frame buffer 10.

In the picture period [2], the buffer A is basically an area into which the data of the (n+2)th frame is to be inputted, and therefore, it is necessary to perform the remaining half of the JPEG-compression of the UXGA-size data before the n-th frame data is overwritten with the (n+2) frame data. Therefore, this compression processing is positioned at the top of the picture period [2], unlike the picture period [1]. By performing the processing in such order, handing of data to the communication unit 3 is continuously performed, and handling thereof is simplified further.

In this embodiment, the processing performance determination unit 311 is assumed to exist in the network control unit 310 of the communication unit 3. However, it is also possible, for example, to arrange it in the image processing unit 1 or implement it as a part of functions incorporated in the control sequencer 70 of the image processing unit 1, similarly to the first embodiment. Its position is not limited by this embodiment. If the processing performance determination unit 311 is incorporated in the control sequencer 70, the content of the processing operations requested by the respective terminals are communicated to the control sequencer 70 via a control signal line 71 between the image processing unit 1 and the communication unit 3, through the network control unit 310. The above determination is made with the use of the information. Then, whether the service of the determination result can be provided or not is communicated to the network control unit 310 via a control signal line 71 between the image processing unit 1 and the communication unit 3 so that the network control unit 310 sends the information to each terminal.

However, similarly to the first embodiment, from the viewpoint of reducing the entire processing load as far as possible by performing only necessary data transmission as described above, it is more desirable that the processing performance determination unit 311 exists in the network control unit 310 of the communication unit 3 as in this embodiment.

As a result, it is possible to perform image compression processing of multiple areas and image compression processing of images with multiple resolutions within one picture period with one codec. Especially, it is possible to process a high-resolution picture to obtain images with an arbitrary field angle and arbitrary resolution based on users' desire, such as an image obtained by clipping an arbitrary area of a taken image with high resolution for which the resolution conversion is performed and a partially clipped image for which the resolution conversion is not performed, for multiple users within one picture period with one codec.

Furthermore, this embodiment makes it possible to process high-resolution data with the use of multiple picture periods. Especially, in this embodiment, services are provided by assigning JPEG-compression of UXGA-size data to two successive picture periods and controlling the processing order so that the processing operations are continuously performed. As a result, the necessity of having a frame buffer dedicated for keeping the high-resolution data through multiple picture periods is eliminated, and the effect of saving the memory size is obtained.

However, the method for the assignment for the processing order is not fixed, and it is changeable depending on the service policy for users. For example, it is also possible to perform the processing at the top of one picture period prior to other processing operations.

Furthermore, when it is necessary to perform processing through more than two periods, the frame buffer can be configured so that frame data can be kept through multiple picture periods, and the way to keep the frame data is not limited by this embodiment.

Fourth Embodiment

In the third embodiment, since resolution-converted images are directly and sequentially compressed, they can be used only once. However, it is conceivable that a request is made to compress images obtained by performing the same resolution conversion of an original image, with different compression parameters. In this case, it is conceivable to perform the same resolution conversion twice, as one method. However, especially when the image resolution of the original data is high, much time is required for reading the original image from a frame buffer and performing resolution conversion thereof, and the performance of processing to be performed within one picture period is lowered.

In order to avoid this, it is conceivable to send a resolution-converted image to the processing by the codec and, at the same time, temporarily accumulate the image once in the frame buffer to use it in the subsequent processing, if the same resolution conversion processing is required in the subsequent processing or if it is effective to use a resolution-converted image to perform further resolution conversion processing. Such a case will be described with reference to FIGS. 1 and 4 and FIGS. 12 to 14.

The same components in FIGS. 1 and 4 in the first embodiment are also used in this embodiment. In this embodiment, similarly to the second embodiment, it is assumed that the sensor 220 of the image capturing unit 2 in FIG. 1 is an all-pixel reading system CMOS sensor, and that the number of valid pixels is 1600×1200, a so-called UXGA size. It is assumed that the pixels are square pixels, and that an UXGA image corresponding to one frame can be outputted every 1/30 second. That is, one picture period in this embodiment is assumed to be 1/30 second (approximately 33.3 ms).

Figure 12:
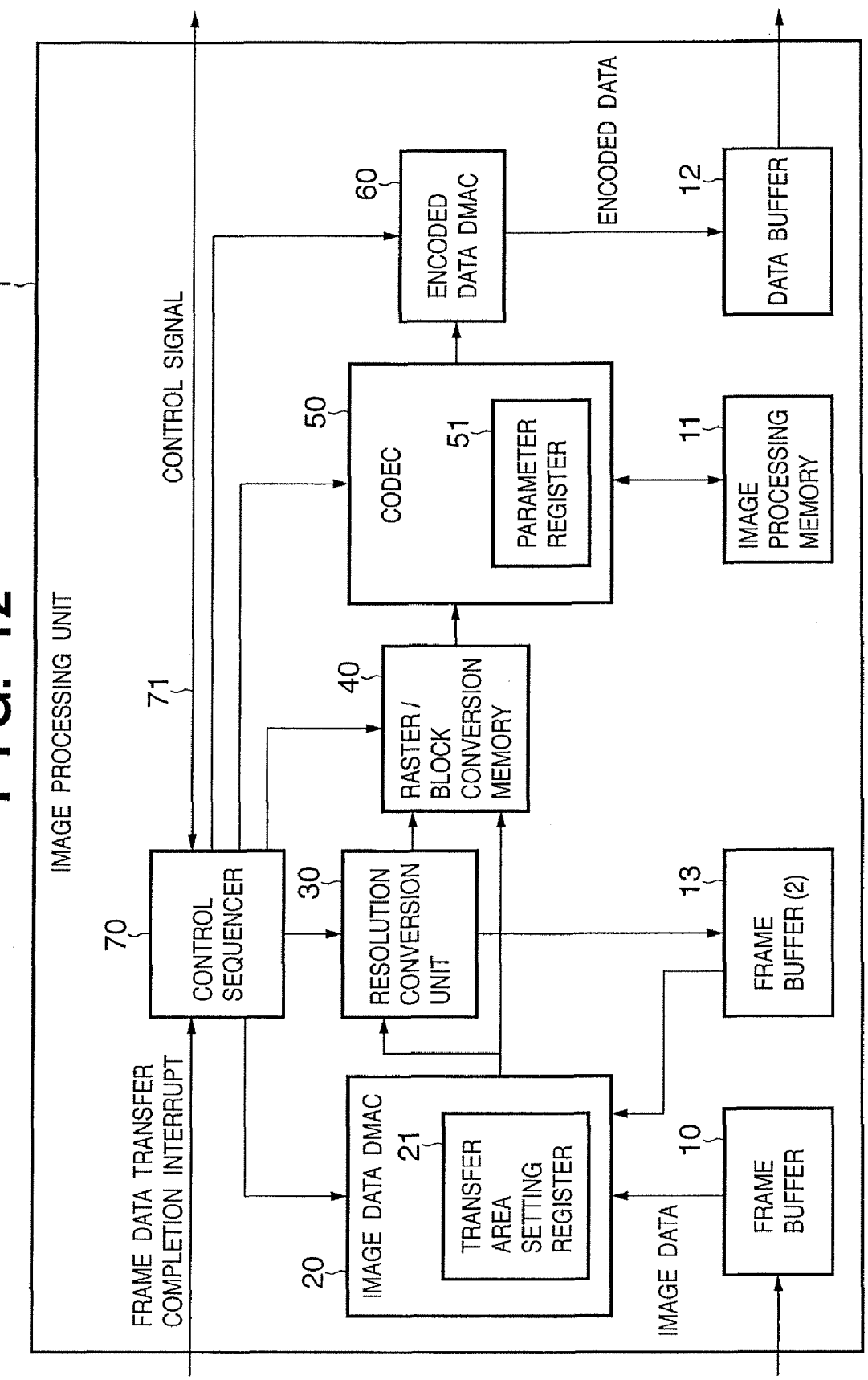
FIG. 12 is a diagram showing the details of an image processing unit in a fourth embodiment of the present invention.

FIG. 12 shows the configuration in the case where a frame buffer (2) 13 for temporarily accumulating data processed by the resolution conversion unit 30 exists in the image processing unit 1. In comparison with FIG. 8 in the third embodiment, the frame buffer (2) 13 is added as a functional block, and a data path from the resolution conversion unit 30 and a data path to the image data DMAC 20 are added.

Similarly to the frame buffer 10, the image processing memory 11 and the data buffer 12, when the other components of the image processing unit are realized in one IC, this frame buffer (2) 13 can be arranged as an on-chip memory on the same IC or realized as a memory device (for example, as an SDRAM of SDR or DDR) connected to the IC outside the IC. Furthermore, various configurations of the memories are also possible, such as arranging each of the memories in separate memory devices and arranging them on the same memory device.

Figure 13:
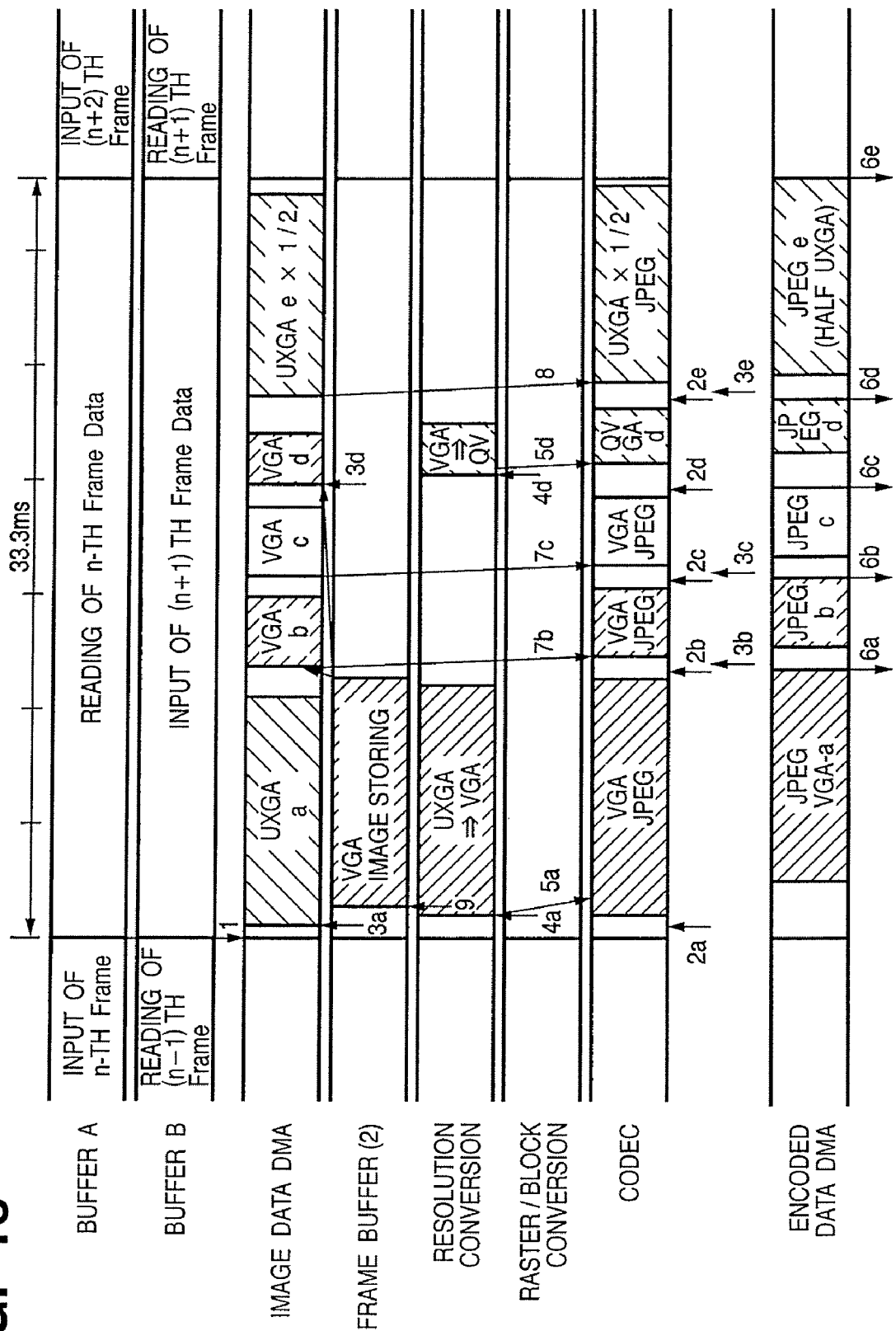
FIG. 13 is a diagram showing the operational flow of the image processing unit in the fourth embodiment of the present invention.
Figure 14:
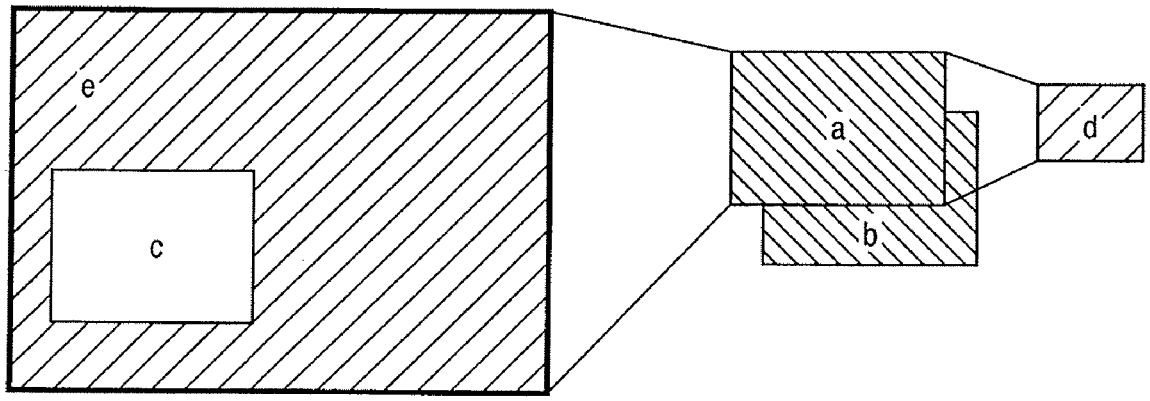
FIG. 14 is a diagram showing field angles and resolutions of images requested by the viewer side, in the fourth embodiment of the present invention.

FIG. 13 is a diagram showing the operation of the image processing unit in this embodiment, and FIG. 14 is a diagram showing field angles and resolutions requested in this embodiment. As seen from FIG. 14, it is assumed in this embodiment that data obtained by compressing images which has been converted from UXGA-size data to VGA-size data with the same field angle, with different two kinds of compression parameters (data a and b), a QVGA-size image with the same angle (data d), data obtained by compressing a VGA-size image clipped from the UXGA-size original data (data c), and data obtained by directly compressing the UXGA-size image (data e) are requested. Here, the data a to e correspond to requests from the terminals 400a to 400e in FIG. 4, respectively.

In FIG. 13, the beginning to the middle of the image processing flow is the same as that in FIG. 9 in the third embodiment. A different point is that, when the resolution conversion unit 30 starts resolution conversion from UXGA to VGA (arrow 4a in FIG. 13), resolution-converted image data is sequentially provided for the raster/block conversion memory 40, and at the same time, they are transferred to the frame buffer (2) 13 to start accumulation of the VGA image (arrow 9 in FIG. 13). As for determination about whether or not to accumulate the resolution-converted image in the frame buffer (2) 13, it is assumed that setting therefor has been made in advance for the control sequencer 70 of the image processing unit 1 by the network control unit 310 with the use of a control signal line 71 between the image processing unit 1 and the communication unit 3, based on a request from each display terminal on the network.

The codec 50 performs JPEG compression of the image data given from the raster/block conversion memory 40 (arrow 5a in FIG. 13), in accordance with the parameter value (Q=Qa) set in the parameter register 51 to generate encoded data JPEG: VGA-a, and the encoded data DMAC 60 sequentially transfers the data to the data buffer 12. Then, when transfer of all the encoded data is completed, the control sequencer 70 sends out an encoded data transfer completion interrupt notification to the data buffer communication unit 3 (arrow 6a in FIG. 13). This interrupt notification is communicated via a control signal line 71 between the image processing unit 1 and the communication unit 3. This image is sent to the terminal 400a by the communication unit 3.

Then, the control sequencer 70 checks the parameter, the field angle and the resolution for the image processing requested next. Then, the parameter Q=Qb to be used for the compression requested next is set in the parameter register 51 of the codec 50 (arrow 2b in FIG. 13).

Then, the control sequencer 70 instructs the image data DMAC 20 to set the frame buffer (2) 13 in the transfer area setting register 21 as a data transfer source and start transfer for providing the data for the codec 50 (arrow 3*a* in FIG. 13) so that image compression processing is performed with the use of the data which has already been resolution-converted to VGA data. The image data DMAC 20 reads the VGA data from the frame buffer (2) 13 and provides it for the codec 50 after blocking it via the raster/block conversion memory 40. The codec 50 performs compression processing with the use of the set parameter Qb.

Then, after compression of the VGA-size clipped image is performed, processing of the QVGA-size image data (data d) is requested with the same field angle as the original UXGA image. Since the VGA image with the same field angle has already been accumulated in the frame buffer (2) 13, the requested QVGA image can be easily created by performing resolution conversion using the accumulated VGA image.

The control sequencer 70 first instructs the resolution conversion unit 30 to perform VGA-to-QVGA conversion (the timing is not shown). Then, the control sequencer 70 instructs the image data DMAC 20 to set the frame buffer (2) 13 in the transfer area setting register 21 as a data transfer source and start transfer for providing the data for the codec 30 (arrow 3*d* in FIG. 13) so that image resolution conversion is performed with the use of the data which has already been resolution-converted to VGA data.

The image data DMAC 20 reads the VGA data from the frame buffer (2) 13 and provides it for the resolution conversion unit 30. The image data converted from VGA to QVGA by the resolution conversion unit 30 is blocked via the raster/block conversion memory 40 and provided for the codec 50 (arrow 5*d* in FIG. 13). The codec 50 performs compression processing with the use of the set parameter Qd. Since the subsequent flow is similar to that in the third embodiment, a description thereof will be omitted.

In this embodiment also, the processing performance determination unit 311 is assumed to exist in the network control unit 310 of the communication unit 3. However, it is also possible, for example, to arrange it in the image processing unit 1 or implement it as a part of functions incorporated in the control sequencer 70 of the image processing unit 1, similarly to the first embodiment. Its position is not limited by this embodiment. However, similarly to the first embodiment, from the viewpoint of reducing the entire processing load as far as possible by performing only necessary data transmission as described above, it is more desirable that the processing performance determination unit 311 exists in the network control unit 310 of the communication unit 3 as in this embodiment.

Thereby, it is possible to efficiently perform image compression processing of multiple areas within one picture period with the use of one codec, in addition to the effect of the third embodiment. Especially, by making it possible to accumulate resolution-converted image in a frame buffer in parallel to using it at the codec, the necessity of repeating the same resolution conversion or performing compression based on too detailed data is eliminated in the case where resolution conversion processing of an image with the same field angle is requested by multiple display terminals. Thus, it is possible to improve the processing performance within one picture period and perform processing responding to different requests from more users.

Fifth Embodiment

In the fourth embodiment, a VGA image is created from a UXGA image, and the created VGA image is handed to the raster/block conversion memory 40 for codec processing and, at the same time, accumulated in the frame buffer (2) additionally. With regard to the process flow in this case, resolution conversion, blocking and codec processing are temporally serially performed. However, in the case where it is required to perform data processing of a UXGA image and two images obtained by performing resolution conversion of the UXGA image to the VGA size with the same field angle, in the same picture period, to read the UXGA data from the frame buffer again for resolution conversion after compression of the UXGA image means that reading of the UXGA image data from the frame buffer is repeated, and this seriously lowers the efficiency.

It is conceivable to make it possible to, when codec processing of a picture with some field angle is required and it is necessary to perform codec processing of an image obtained by performing resolution conversion of the picture with the same field angle, in the same picture period, perform both of the codec processing and the resolution conversion processing while reading the data from the frame buffer only once by performing the resolution processing and the codec processing temporally in parallel. In this embodiment, such a case will be described with the use of FIGS. 1, 4 and 12 and FIGS. 15 to 20.

The same components in FIGS. 1 and 4 in the first embodiment are also used in this embodiment. FIG. 12 used for the fourth embodiment is also used here. In this embodiment, similarly to the second embodiment, it is assumed that the sensor 220 of the image capturing unit 2 in FIG. 1 is an all-pixel reading system CMOS sensor, and that the number of valid pixels is 1600×1200, a so-called UXGA size. It is assumed that the pixels are square pixels, and that an UXGA image corresponding to one frame can be outputted every $\frac{1}{30}$ second. That is, one picture period in this embodiment is assumed to be $\frac{1}{30}$ second (approximately 33.3 ms). Since a description of the constituting blocks in FIG. 12 is the same as that for the fourth embodiment, the details thereof will be omitted.

Figure 15:
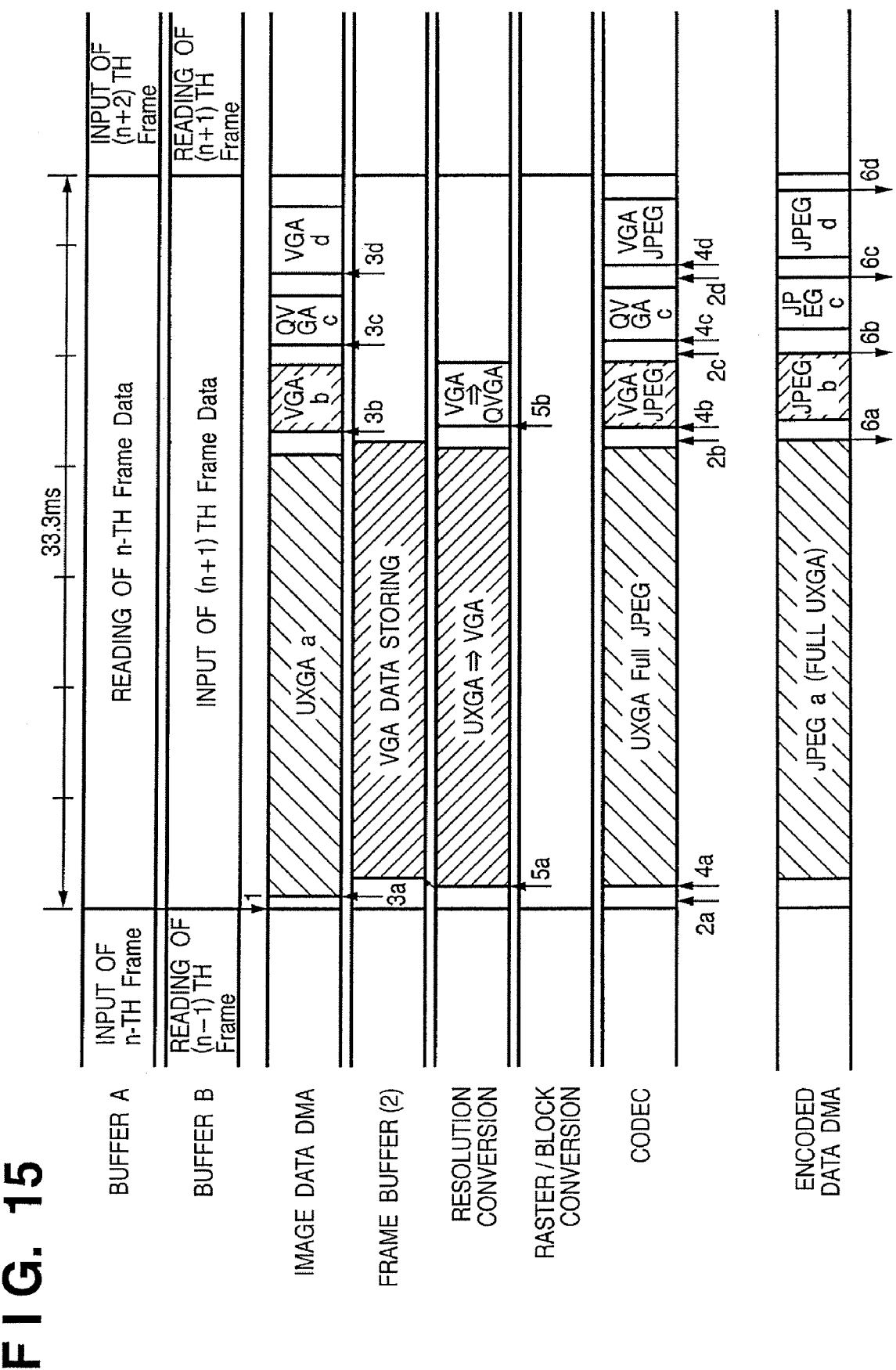
FIG. 15 is a diagram showing the details of an image processing unit in a fifth embodiment of the present invention.
Figure 16:
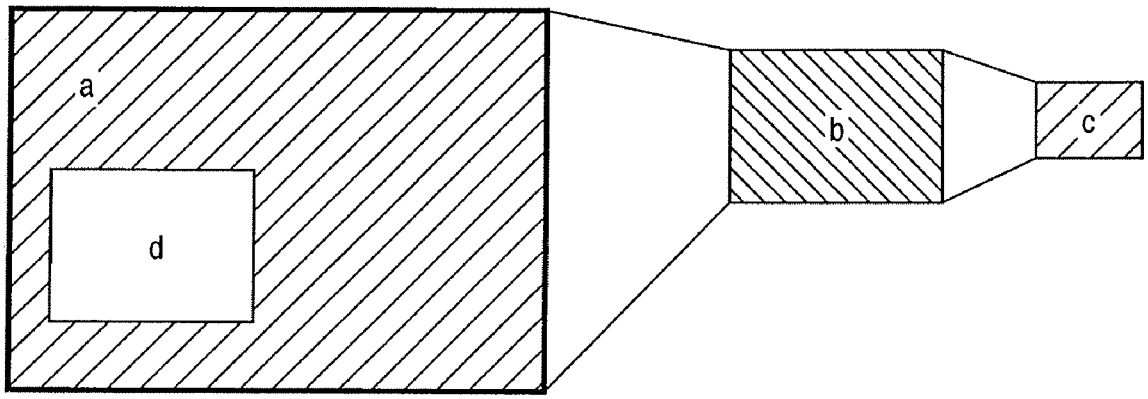
FIG. 16 is a diagram showing field angles and resolutions of images requested by the viewer side, in the fifth embodiment of the present invention.

FIG. 15 is a diagram showing the operation of the image processing unit in this embodiment, and FIG. 16 is a diagram showing field angles and resolutions requested in this embodiment.

As seen from FIG. 16, in this embodiment, data obtained by compressing UXGA-size image data (data a), data obtained by compressing an image converted to the VGA size and having the same field angle as the UXGA-size image (data b), a QVGA-size image with the same field angle as the data b (data c), and an data obtained by compressing a VGA-size image clipped from the UXGA-size original data (data d) are requested. Here, the data a to d correspond to requests from the terminals 400*a* to 400*d* in FIG. 4, respectively.

The processing performance determination unit 311 determines where redundant field angles or such parts as can be operated in parallel exist, decides an operation sequence for the image processing unit 1 in such a form as causes the image processing unit 1 to exert its maximum capability, and instructs the control sequencer 70 to operate using a control signal transmitted on a control signal line 71 between the image processing unit 1 and the communication unit 3. The operation of the image processing unit 1 will be described below.

In FIG. 12, UXGA-size image data outputted from the developing unit 230 is stored in the frame buffer 10 in frames. As shown in FIG. 15, the inside of the frame buffer 10 is configured in a double buffer form, and image data of the n-th frame and the (n+1)th frame are stored in different areas (buffers A and B).

Suppose that accumulation of the data of the n-th frame in the buffer A of the frame buffer 10 has just been completed. Then, frame data transfer completion interrupt notification from the developing unit 230 to the control sequencer 70 occurs (arrow 1 in FIG. 15).

In response to the frame data transfer completion interrupt notification, the control sequencer 70 first sets a parameter for specifying what processing should be performed by the codec procession unit, in the parameter register 51 of the codec 50 (arrow 2a in FIG. 15). In this embodiment, this codec is assumed to perform JPEG compression processing. In this case, a typical example of the compression parameters is a Q value indicating the degree of compression of a picture. It is assumed that Q=Qa requested by the display terminal 400a is set at this time point.

Then, the control sequencer 70 instructs the resolution conversion unit 30 to perform resolution conversion of UXGA-size image data inputted from the image data DMAC 20 to the VGA size. This is done in order to use the UXGA data read for compression of the data a to perform resolution conversion of the data b at the same time (the timing is not shown). In this embodiment, it is necessary to perform image compression processing and resolution conversion processing in parallel with each other. As for the necessity of the parallel processing of the operation, it is assumed that setting therefor has been made in advance for the control sequencer 70 of the image processing unit 1 by the network control unit 310 with the use of a control signal transmitted on the control signal line 71 between the image processing unit 1 and the communication unit 3, based on a request from each display terminal on the network.

The control sequencer 70 then instructs the image data DMAC 20 to read the image data of the n-th frame from the buffer A of the frame buffer 10 and start transfer for providing the data (arrow 3a in FIG. 15). In this embodiment, it is necessary to provide the data read from the frame buffer 10 for the resolution conversion unit 30 and the raster/block conversion memory 40 in parallel, and a parameter is set in the transfer area setting register 21 so that it is achieved. The details of the operation of the image data DMAC 20 will be described with reference to FIGS. 17 and 18.

Figure 17:
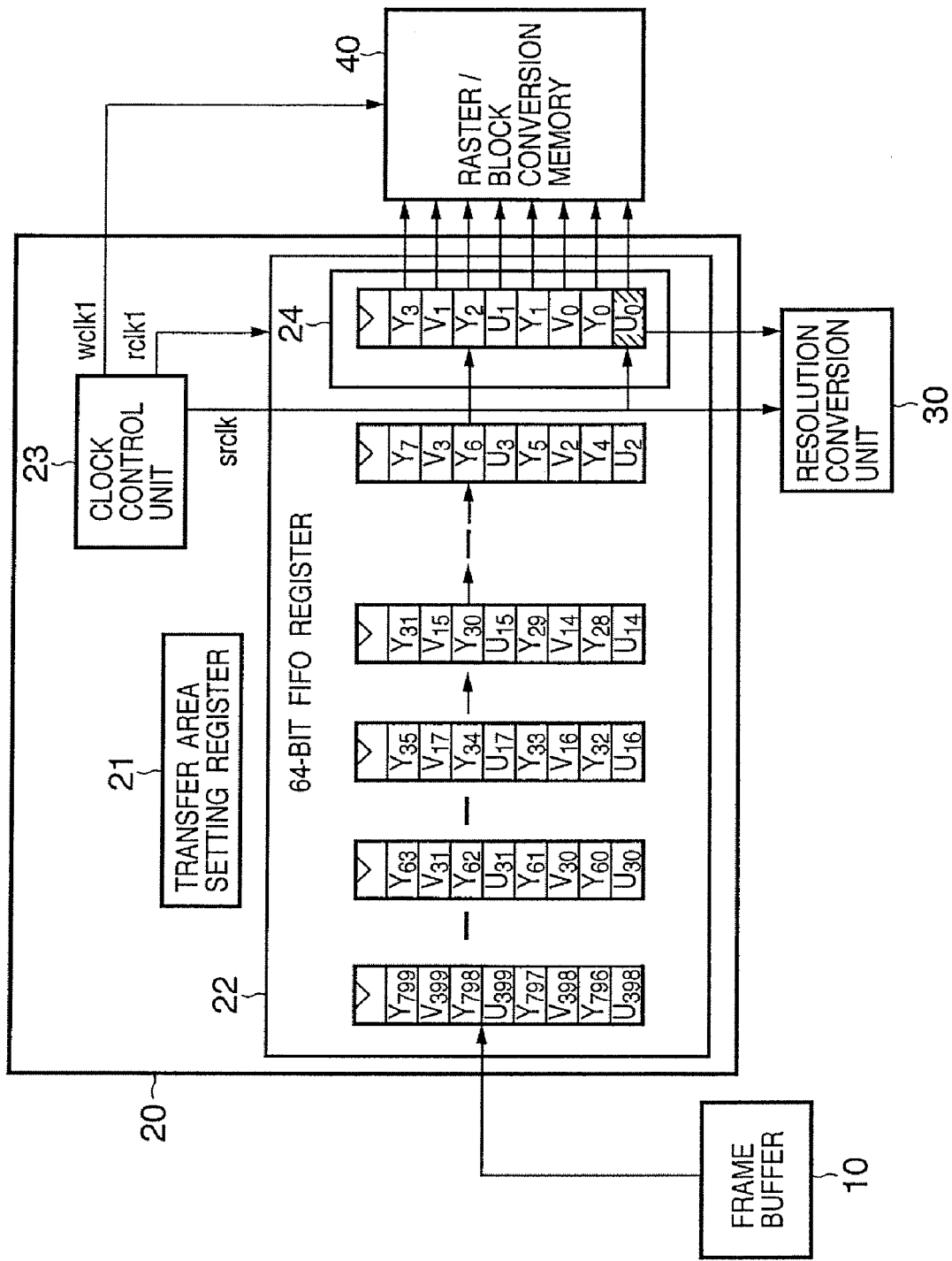
FIG. 17 is a diagram showing the details of an image data DMAC in the fifth embodiment of the present invention.

Here, it is assumed that image data is inputted in a YUV422 form, and the data is stored on the frame buffer 10 in order like U0Y0V0Y1U1Y2V1Y3 .... Each of the data Y, U and V is 8-bit data. In FIG. 17, the image data DMAC reads the data in 64-bit data from the frame buffer 10 and stores the data in a 64-bit FIFO register 22.

In the 64-bit FIFO register 22, data are stored in 8-byte data. On the reading side of the 64-bit FIFO register 22, there are two output-destination systems. One is the raster/block conversion memory 40, which can read 8-byte width data per clock. The other is the resolution conversion unit 30, which receives the Y, U and V data in sample units for each (8 bits).

Figure 18:
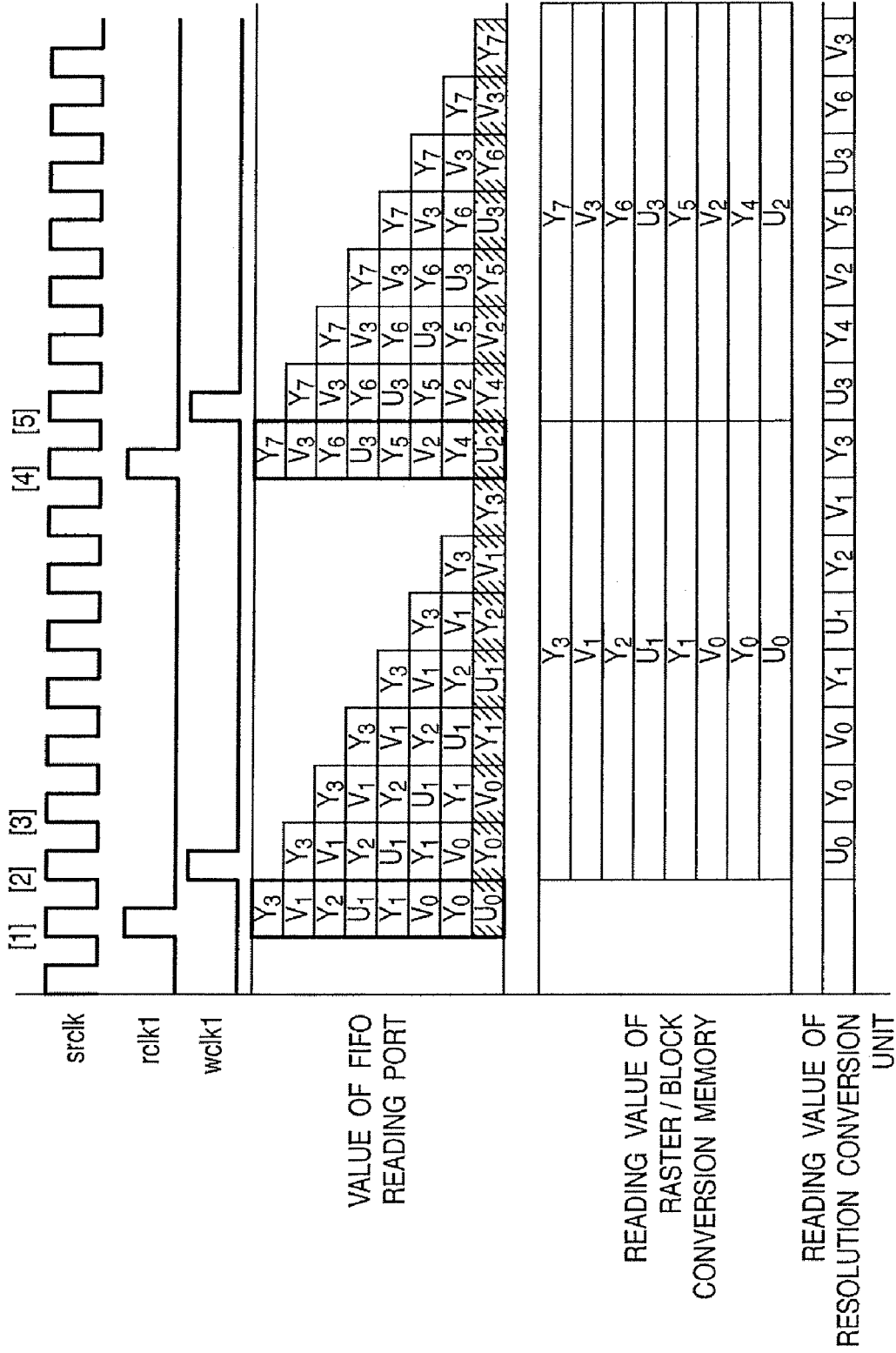
FIG. 18 is a diagram showing the timing of handing over data between the image data DMAC, and a resolution conversion unit and a raster/block conversion memory, in the fifth embodiment of the present invention.

FIG. 18 is a diagram showing the exchange of data between the 64-bit FIFO register 22 and the raster/block conversion memory 40 and the resolution conversion unit 30 which are data output destinations.

The 64-bit FIFO register 22 is basically adapted so that new data is read in the FIFO reading port 24 in 64-bit width data at the rising edge of rclk1. For example, updating with a new value is performed at the FIFO reading port 24 at the timings [1] and [4] in FIG. 18.

When the value of the FIFO reading port is updated, the raster/block conversion memory 40 acquires the data into it at the rising edge of wclk1. Here, the data is read at the timings of [2] and [5] in FIG. 18.

Meanwhile, it is necessary for the resolution conversion unit 30 to receive data in sample units for each data (in 8-bit depth data constituting any of Y, U and V). Here, the units indicated by oblique lines in the FIFO reading port 24 in FIGS. 17 and 18 are assumed to be the output port to the resolution conversion unit 30. The resolution conversion unit 30 reads image data in 8-bit units from the port at each rising edge of srclk.

For example, U0 is read at the rising edge of [2], and Y0 is read at [3]. At the same time, at the FIFO reading port, data is shifted downward by 8 bits for each srclk to update data for making preparation for the next reading. The relation among the timings of srclk, rclk1 and wclk1 is as shown in FIG. 18. Thus, it is possible to enable raster/block conversion processing, codec processing and resolution conversion processing by performing reading from the frame buffer once.

The srclk, rclk1 and wclk1 are signals controlled by a clock control unit 23 in the image data DMAC 20, as shown in FIG. 17. In response to the specification about which clock timing to operate each clock is the most efficient by the control sequencer 70, the clock control unit 23 controls the exchange of data between the 64-bit FIFO register 22 and the raster/block conversion memory 40 and the resolution conversion unit 30 which are output destinations of the data from the 64-bit FIFO register 22, keeping the phase relation shown in FIG. 18, in this embodiment.

When the data is transferred by the image data DMAC 20 from the frame buffer 10 to the raster/block conversion memory 40 as described above, the raster/block conversion memory unit converts the data to 8×8 blocks and provides the blocks for the codec 50, and the codec starts compression processing (arrow 4a in FIG. 15).

Figure 19:
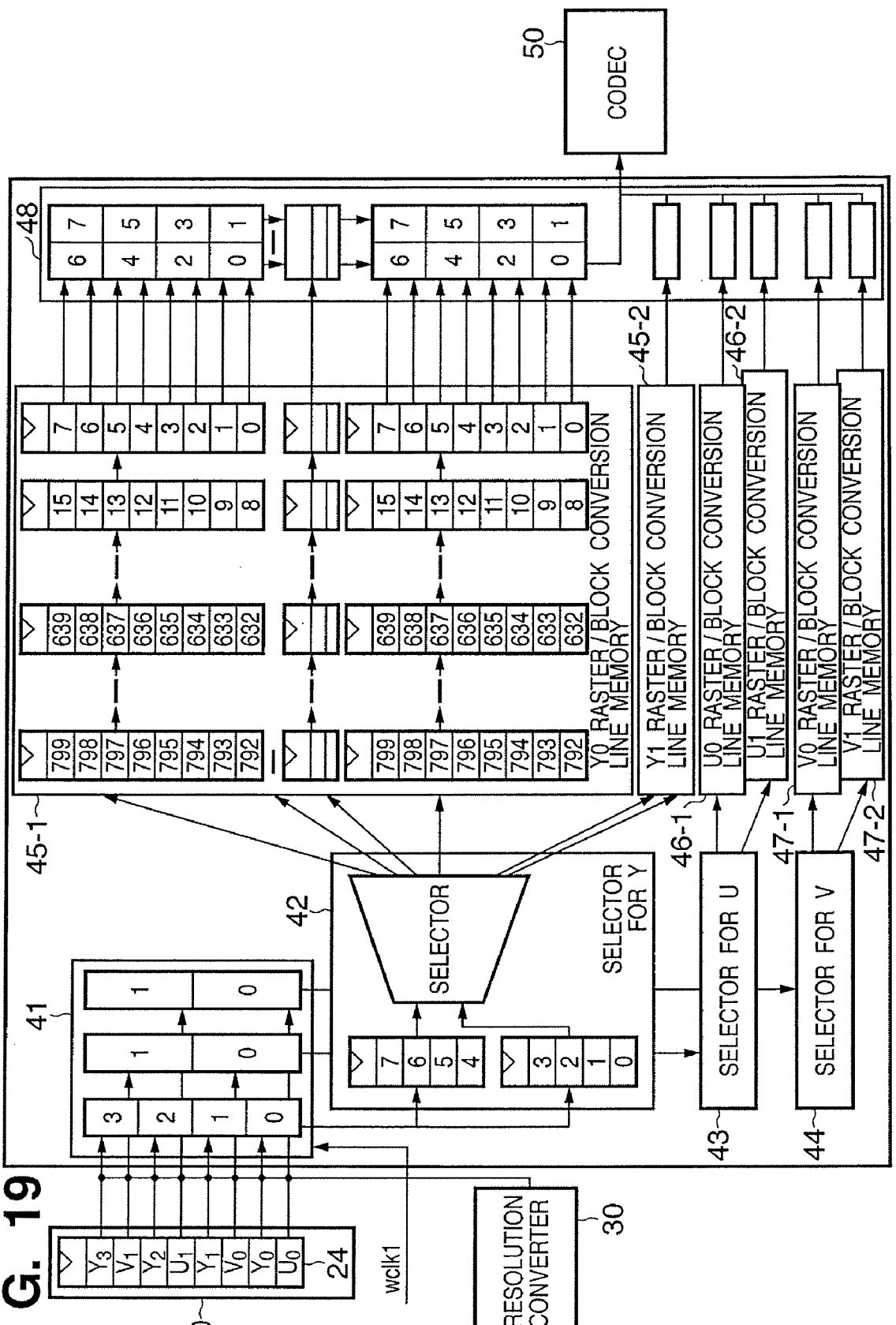
FIG. 19 is a diagram showing the details of the raster/block conversion memory in the fifth embodiment of the present invention.

FIG. 19 is a diagram showing the configuration of the raster/block conversion memory 40.

First, image data in a raster format is stored in a data receiving unit 41 from the reading port 24 of the 64-bit FIFO register 22 of the image data DMAC 20 in synchronization with a wclk1 signal. The data separated into Y, U and V signals by the data receiving unit are sent to signal selectors 42, 43 and 44, respectively.

Inside each of the signal selectors, the separated data are connected to form a horizontal-direction unit (8 samples) of a block. When data corresponding to 8 samples are accumulated, the data is sent to the raster/block conversion line memory for each of the selectors. The line memories are configured as double buffers, that is, a Y0 raster/block conversion line memory 45-1 and a Y1 raster/block conversion line memory 45-2, a U0 raster/block conversion line memory 46-1 and a U1 raster/block conversion line memory 46-2, and a V0 raster/block conversion line memory 47-1 and a V1 raster/block conversion line memory 47-2. Each line memory is configured by 8 lines, each of lines corresponding to 64-bit width memory.

When data is transferred to the codec 50, the data is sequentially read from the right edge at the stage where all 8 lines of one of the memories of each of the line memories Y, U and V are filled with data. In this case, data at the right edge of each line, corresponding to one column, is read to a macro-block transfer buffer 48 first. This means that data corresponding to one block constituted by horizontal-direction 8 samples and vertical-direction 8 lines, that is, a total of 64 samples are prepared at this stage. Then, two Y signal blocks, one U signal block and one V signal block are repeatedly read in that order, and the data is transferred to the codec 50. Even while the reading to the codec 50 is being performed, filling of data in each line memory from which reading is not performed is possible due to the double buffer configuration. At the same time as the codec starts compression processing, the resolution conversion unit starts resolution conversion processing (arrow 5a in FIG. 15).

FIG. 20 is a diagram showing the configuration of the resolution conversion unit 30.

The 8-bit width Y, U and V signals are inputted into the resolution conversion unit 30 in accordance with srclk in order like U0Y0V0Y1U1Y2V1Y3 . . . . Receiving the signals, a selector 34 sorts the signals into Y signals and U/V signals. Then, the Y signals and the U/V signals are inputted into a Y signal line buffer 36 and a U/V signal line buffer 31, respectively. In each line buffer, data is shifted by 8 bits (corresponding to one sample) per clock.

As for the U/V signals, the data U0U1U2 . . . (the number of samples to be used varies depending on required resolution conversion; hereinafter the same) is applied to a U/V horizontal-direction conversion unit 32 at a certain timing when the data is shifted to the position of a register located at the position for input into the horizontal conversion unit, and the operation result is stored in a U signal buffer 33-1. At the next timing, since the register is shifted by one, the data V0V1V2 . . . is applied to the U/V horizontal-direction conversion unit 32, and the operation result is stored in a V signal buffer 33-2. Next, a similar operation is performed for the data U1U2U3 . . . . Thus, U and V data are alternately processed.

As for the Y signals, data Y0Y1Y2Y3 . . . is applied to a Y horizontal-direction conversion unit 37 at a certain timing, and the operation result is stored in a Y signal buffer 38. At the next timing, Y1Y2Y3Y4 data is processed. Thus, while each of U and V data corresponding to one pixel is processed, processing of Y data corresponding to two pixels is executed. By performing parallel processing of U/V and Y signals as described above, it is possible to perform resolution conversion of data in a YUV422 format while synchronizing the timings of signals.

After that, when data for which horizontal-direction resolution conversion processing has been performed are accumulated in the vertical-direction U signal buffer 33-1, the V signal buffer 33-2 and the Y signal buffer 38, the data is then applied to a vertical-direction resolution converter to perform vertical-direction resolution conversion therefor. A U/V vertical-direction conversion unit 35 alternately processes U and V data. Similarly to the case of the horizontal direction, a Y vertical direction conversion unit 39 executes processing of the Y data corresponding to two pixels while the U/V vertical-direction conversion unit 35 performs processing of each of the U and V data corresponding to one pixel.

The image data which has been resolution-converted in this way is then sent to the frame buffer (2) 13 and waits for the next compression processing, in this embodiment. If the resolution-converted data are accumulated and, at the same time, used for compression processing as shown in the fourth embodiment, the processed data is also outputted to the raster/block conversion memory 40.

Again, in FIG. 15, raster/block conversion, codec processing and resolution conversion processing are performed in parallel as described above. Created VAG data is accumulated in the frame buffer (2) 13 and waits for start of processing using the VGA data. Meanwhile, the codec 50 performs JPEG compression of the image data given from the raster/block conversion memory 40, in accordance with the parameter value (Q=Qa) set in the parameter register 51, and the compressed encoded data JPEGa is sequentially handed to the encoded data DMAC 60. The encoded data DMAC 60 transfers the encoded data to the data buffer 12 in predetermined units.

Then, when transfer of all the encoded data is completed, the control sequencer 70 sends out an encoded data transfer completion interrupt notification to the communication unit 3 (arrow 6a in FIG. 15). This interrupt notification is communicated via a control signal transmitted on the control signal line 71 between the image processing unit 1 and the communication unit 3. In response to this interrupt notification, the communication unit 3 sends the JPEGa data to the display terminal 400a.

When image compression of the UXGA data ends, processing using the VGA-size image data which has been resolution-converted before and accumulated in the frame buffer (2) 13 is started. The image data DMAC 20 reads the VGA-size image data from the frame buffer (2) 13 and starts processing (arrow 3b in FIG. 15). This time also, the processing at the codec 50 and the resolution conversion processing from VGA to QVGA data by the resolution conversion unit 30 are performed in parallel with the use of this VGA data (arrows 4b and 5b in FIG. 15). The QVGA data created by the resolution conversion unit 30 is accumulated in the frame buffer (2) 13 and used for the next compression processing operation. Since the subsequent process is similar to the operation of the part described before, a description thereof will be omitted.

In this embodiment, the processing performance determination unit 311 is assumed to exist in the network control unit 310 of the communication unit 3. However, it is also possible, for example, to arrange it in the image processing unit 1 or implement it as a part of functions incorporated in the control sequencer 70 of the image processing unit 1, similarly to the first embodiment. Its position is not limited by this embodiment. However, similarly to the first embodiment, from the viewpoint of reducing the entire processing load as far as possible by performing only necessary data transmission as described above, it is more desirable that the processing performance determination unit 311 exists in the network control unit 310 of the communication unit 3 as in this embodiment.

Thereby, it is possible to efficiently perform image compression processing of multiple areas within one picture period with the use of one codec, in addition to the effect of the fourth embodiment. Especially, by using a picture read from the frame buffer at the coded processing unit and the resolution conversion unit in parallel, the number of times of reading original data before resolution conversion can be reduced when it is requested by multiple display terminals to process images with the same field angle and different resolutions in the same picture period. Accordingly, the band performance of memories and buses can be effectively used, and it is possible to improve the processing performance when multiple images are processed within one picture period. As a result, it is possible to perform processing that responds to different requests from more users.

Sixth Embodiment

In the third embodiment, processing of an image with a half size of a UXGA-size, an image which has been resolution-converted to the VGA resolution, with the same field angle as the UXGA image, and two kinds of VGA-size image clipped from the UXGA-size image is performed within one picture period. It is not assumed that the resolution conversion unit and the codec operate in parallel in the third embodiment. However, as shown in the fifth embodiment, the processing capability can be further improved by further adding a function of separating and performing the resolution conversion multiple times in the case where the resolution conversion unit and the codec can operate in parallel, and adding a function of performing processing through multiple picture periods in the case where processing of partial images is continuously performed.

Such a case will be described with the use of FIGS. 1, 4 and 12, and FIGS. 21 to 23A and 23B.

The same components in FIGS. 1 and 4 in the first embodiment are also used in this embodiment. The same components in FIG. 12 in the fourth embodiment are also used in this embodiment. In this embodiment, similarly to the second embodiment, it is assumed that the sensor 220 of the image capturing unit 2 in FIG. 1 is an all-pixel reading system CMOS sensor, and that the number of valid pixels is 1600×1200, a so-called UXGA size. It is assumed that the pixels are square pixels, and that an UXGA image corresponding to one frame can be outputted every 1/30 second. That is, one picture period in this embodiment is assumed to be 1/30 second (approximately 33.3 ms).

Figure 21:
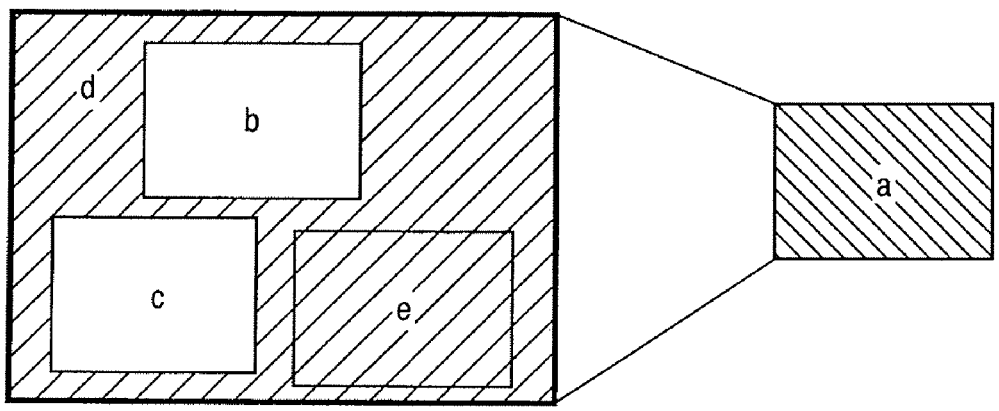
FIG. 21 is a diagram showing field angles and resolutions of images requested by the viewer side, in a sixth embodiment of the present invention.

FIG. 21 is a diagram showing field angles and resolutions requested in this embodiment.

The requested images are basically the same as those in the third embodiment (FIG. 10). Since the processing performance is improved in this embodiment, the processing performance determination unit 311 newly adds VGA-size image data e which has been clipped from the UXGA-size original data as a processing target. It is assumed that data obtained by directly compressing the UXGA-size image (data d) is required to be processed at half the frame rate, in comparison with the other images. Here, the data a to e correspond to requests from the terminals 400a to 400e in FIG. 4, respectively.

Figure 22:
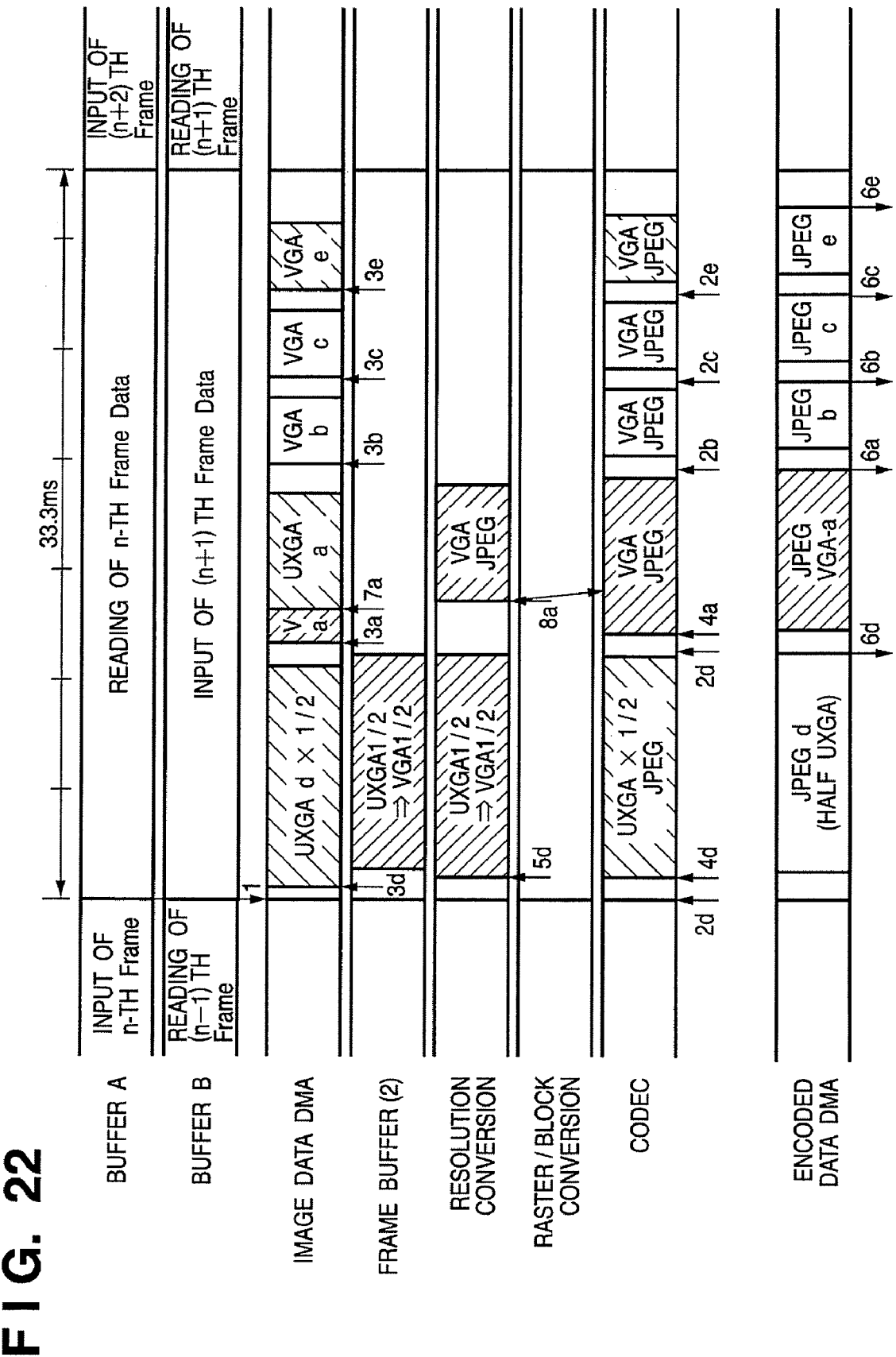
FIG. 22 is a diagram showing the operational flow of an image processing unit in the sixth embodiment of the present invention.

FIG. 22 shows the process flow. In this embodiment, when processing of images with the same field angle and different resolutions are requested, the processing performance determination unit 311 checks whether or not there is any part where the codec processing and the resolution conversion processing can be performed in parallel by utilizing reading from the frame buffer once. If there is any part where the processing operations can be performed in parallel, the processing performance determination unit 311 checks whether or not the part where the processing operations can be parallelized is a partial image.

For example, when compression of ½-UXGA-size image data (data d) and compression of an image obtained by performing resolution conversion from the image of the UXGA-size original data to a VGA-size image (data a) are requested to be performed in a first picture period as in this embodiment, it is possible to use image data read from the frame buffer when compressing the ½-UXGA-size image data to perform the former half of the UXGA to VGA resolution conversion in parallel with the compression. In such a case, the processing performance determination unit 311 instructs the control sequencer 70 to execute in parallel the parts which can be parallelized, and complete the remaining processing based on the result.

A description will be provided below on how the control sequencer 70 controls each component of the image processing unit 1 to execute processing in accordance with the content of the instruction.

The basic process flow is almost the same as that of the fifth embodiment. This time, however, the image compressed first is an image with a half size of the UXGA size. And, in parallel with the processing, processing corresponding to a ½ VGA-size image which can be created by processing the ½ UXGA image data read for compression is performed among UXGA to VGA image resolution conversions required for the subsequent processing (arrow 5d in FIG. 22). The created ½ VGA image is stored in the frame buffer (2) 13.

When processing corresponding to half the UXGA data ends (arrow 6d in FIG. 22), the control sequencer 70 then starts processing of the VGA-size image a having the same field angle as the UXGA-size image d. First, the control sequencer 70 reads the image from the frame buffer (2) 13 and instructs the image data DMAC 20 to transfer the ½ VGA data part which has already been resolution-converted (arrow 3a in FIG. 22) so that codec processing is performed therefor. In response to the transfer, the codec 50 starts compression processing (arrow 4a in FIG. 22).

When processing using the ½ VGA data part accumulated in the frame buffer (2) 13 ends, the control sequencer 70 then instructs the image data DMAC 20 to transfer the latter-half ½ UXGA data to be the original data for resolution conversion to the resolution conversion unit 30 so that a latter half VGA image is created and compressed (arrow 7a in FIG. 22). Receiving the latter half ½ UXGA data, the codec 30 starts remaining UXGA to VGA conversion (arrow 8a in FIG. 22).

The resolution-converted image data is sent to the codec 50 after raster/block conversion, and the codec performs compression processing of the latter half of the VGA data. A description of the subsequent process is omitted because it is redundant with the description in the embodiments described above.

Figure 23A:
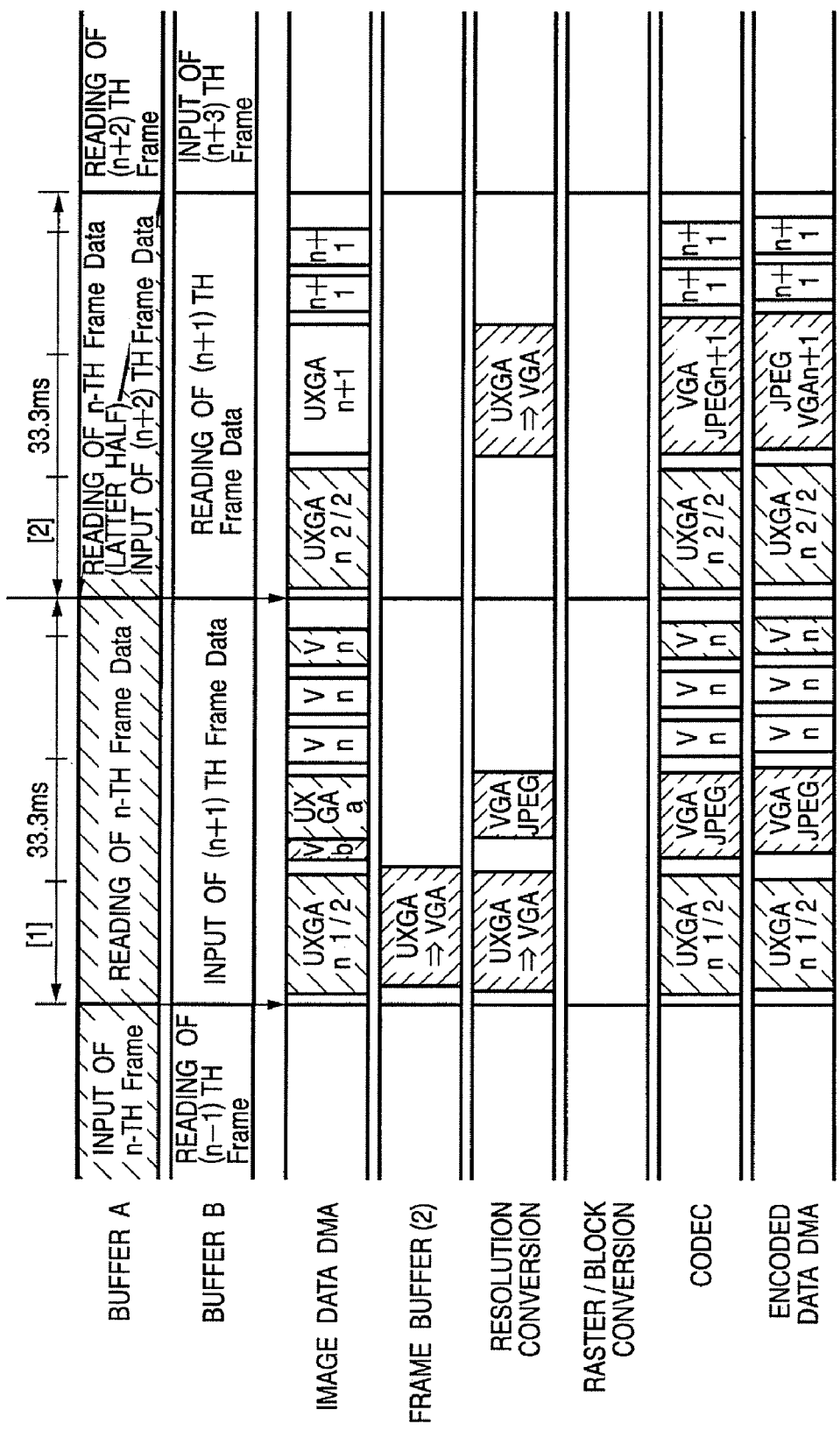
FIGS. 23A and 23B are diagrams showing the operational flow of the image processing unit for successive two picture periods, in the sixth embodiment of the present invention.
Figure 23B:
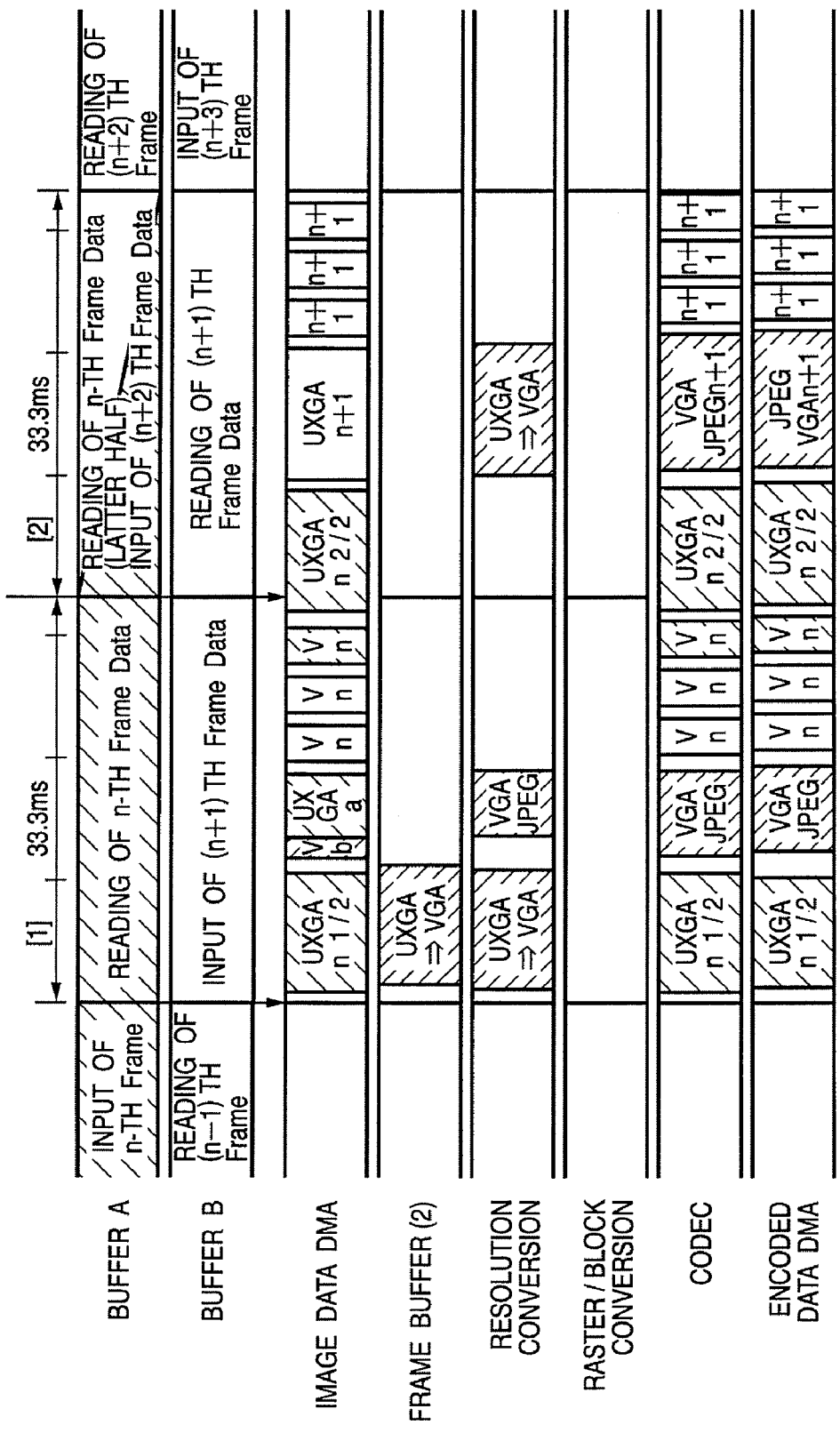

The case of performing this processing through two successive picture periods is shown in FIGS. 23A and 23B. Here, it is requested to process each of halves of an UXGA image in each of two successive picture periods, and such processing is performed. FIG. 23A shows the case where this processing is scheduled to be performed within a segment of each one picture period.

A picture period [1] in FIG. 23A shows the same content in FIG. 22. In this case, the latter half of compression processing of the UXGA image of the n-th frame performed in the picture period [1] is to be performed in a picture period [2]. However, this image is different from the VGA image of the (n+1)th frame requested for the picture period [2], and therefore, resolution conversion processing and codec processing cannot be executed in parallel. Consequently, it is necessary to separately perform resolution conversion processing from the beginning for the VGA image in the picture period [2]. Therefore, more processing time is required, and only less processing of VGA clipped image (corresponding to the data e) can be performed in the picture period [2], in comparison with the picture period [1].

Actually, however, the latter half of processing of the UXGA image performed in the picture period [2] is not necessarily required to be performed in the time [2]. Since the data already exists in the buffer A of the frame buffer 10, there is no problem in performing processing through the picture periods [1] and [2], regarding the successive two picture periods as one period if the processing capability for the picture period [1] is sufficient. Such a case is shown in FIG. 23B.

Here, the latter half of the processing of the UXGA image is performed in advance by applying excess processing time to the picture period [1] thereto. Excess processing time is thereby also applied to the picture period [2], and VGA clipped image processing can be executed once more than the case in FIG. 23A. As a result, the difference between the image processing capability between the picture periods [1] and [2] are successfully eliminated.

In this embodiment, the processing performance determination unit 311 is assumed to exist in the network control unit 310 of the communication unit 3. However, it is also possible, for example, to arrange it in the image processing unit 1 or implement it as a part of functions incorporated in the control sequencer 70 of the image processing unit 1 similarly to the first embodiment. Basically, its position is not limited by this embodiment. If the processing performance determination unit 311 is incorporated in the control sequencer 70, the content of processings requested by the respective terminals are communicated to the control sequencer 70 via a control signal transmitted on the control signal line 71 between the image processing unit 1 and the communication unit 3, through the network control unit 310. The above determination is made with the use of the information.

Then, whether the service of the determination result can be provided or not is communicated to the network control unit 310 via a control signal transmitted on the control signal line 71 between the image processing unit 1 and the communication unit 3 so that the network control unit 310 sends the information to each terminal. However, similarly to the first embodiment, from the viewpoint of reducing the entire processing load as far as possible by performing only necessary data transmission, it is more desirable that the processing performance determination unit 311 exists in the network control unit 310 of the communication unit 3 as in this embodiment.

Thus, it is possible to enhance the capability of performing processing by one processing apparatus within one picture period in addition to the effect of the fifth embodiment, by parallelizing a part of the processing which can be parallelized, even if it is partial parallelization, and providing a mechanism capable of, when originally required processing is partially performed because of realizing the parallelization, complementing the processing. In this embodiment, it is possible to perform VGA image processing for one image more than the third embodiment. As a result, it is possible to perform processing responding to different requests from more users by one processing apparatus within one picture period.

Furthermore, by adding a function of performing processing through multiple picture periods in the case of continuously performing processing of partial images for multiple successive picture periods, it is possible to further enhance the processing capability and reduce the variation among processing capabilities in the multiple picture periods due to a difference in the degree of parallelization of execution.

Seventh Embodiment

In the first to sixth embodiments, JPEG compression processing is basically used as an example of codec processing. However, the codec processing is not limited to JPEG compression processing. A description will be provided of the case of performing compression processing operations with multiple methods multiple times within one picture period with the use of FIGS. 1, 12, 19, 24 and 25.

The same components in FIG. 1 in the first embodiment are also used in this embodiment. The same components in FIGS. 12 in the fourth embodiment are also used in this embodiment. Furthermore, the same components in FIG. 19 in the fifth embodiment are also used in this embodiment. Similarly to the first embodiment, the sensor 220 of the image capturing unit 2 in FIG. 1 is assumed to be a square pixel progressive format CCD in this embodiment. It is assumed that the number of valid pixels is 640×480, a so-called VGA size, and that a one-frame VGA image can be outputted for each 1/30 second. That is, one picture period in this embodiment is assumed to be 1/30 second (approximately 33.3 ms).

Figure 24:
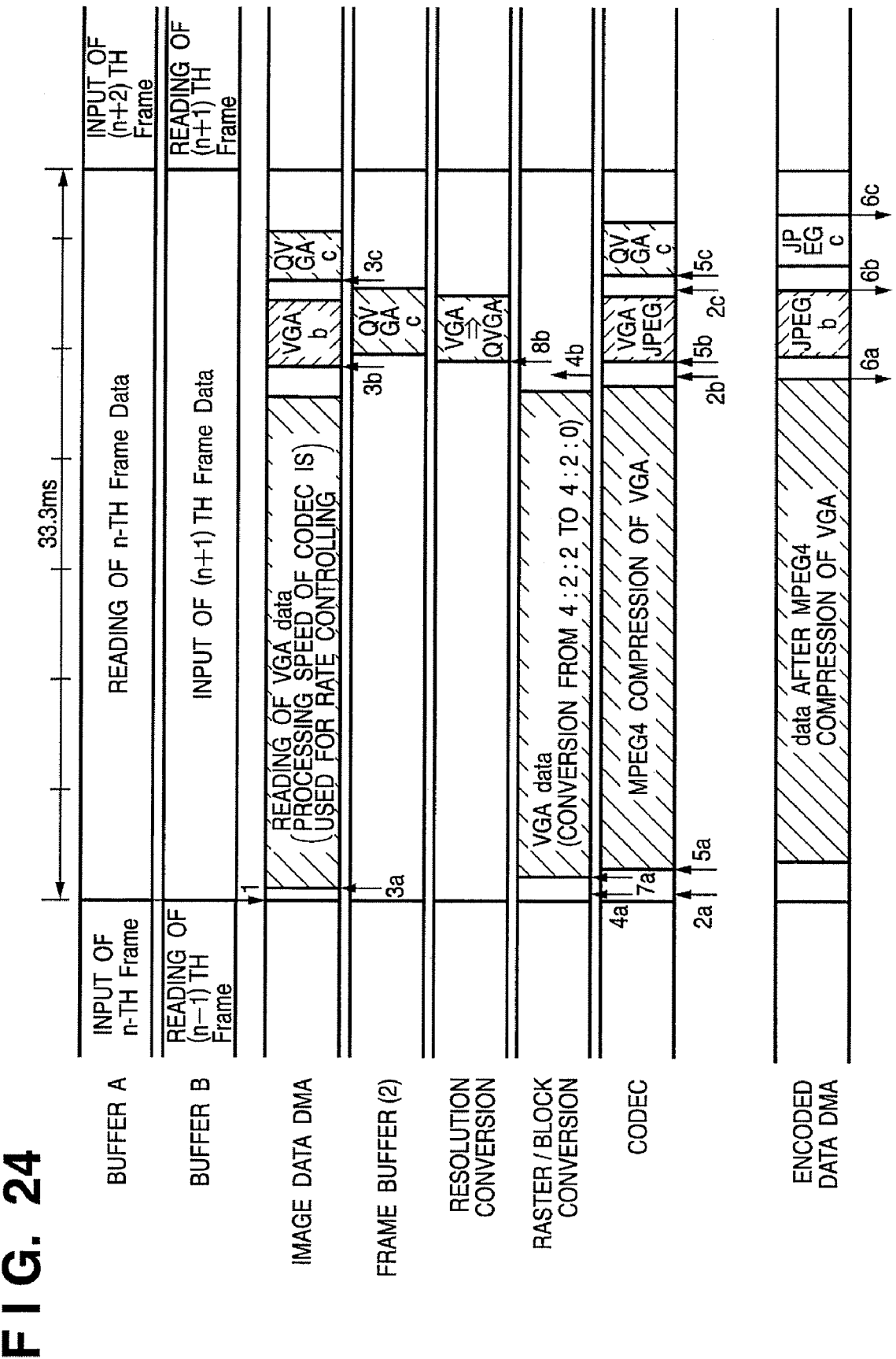
FIG. 24 is a diagram showing the operational flow of an image processing unit in a seventh embodiment of the present invention.
Figure 25:
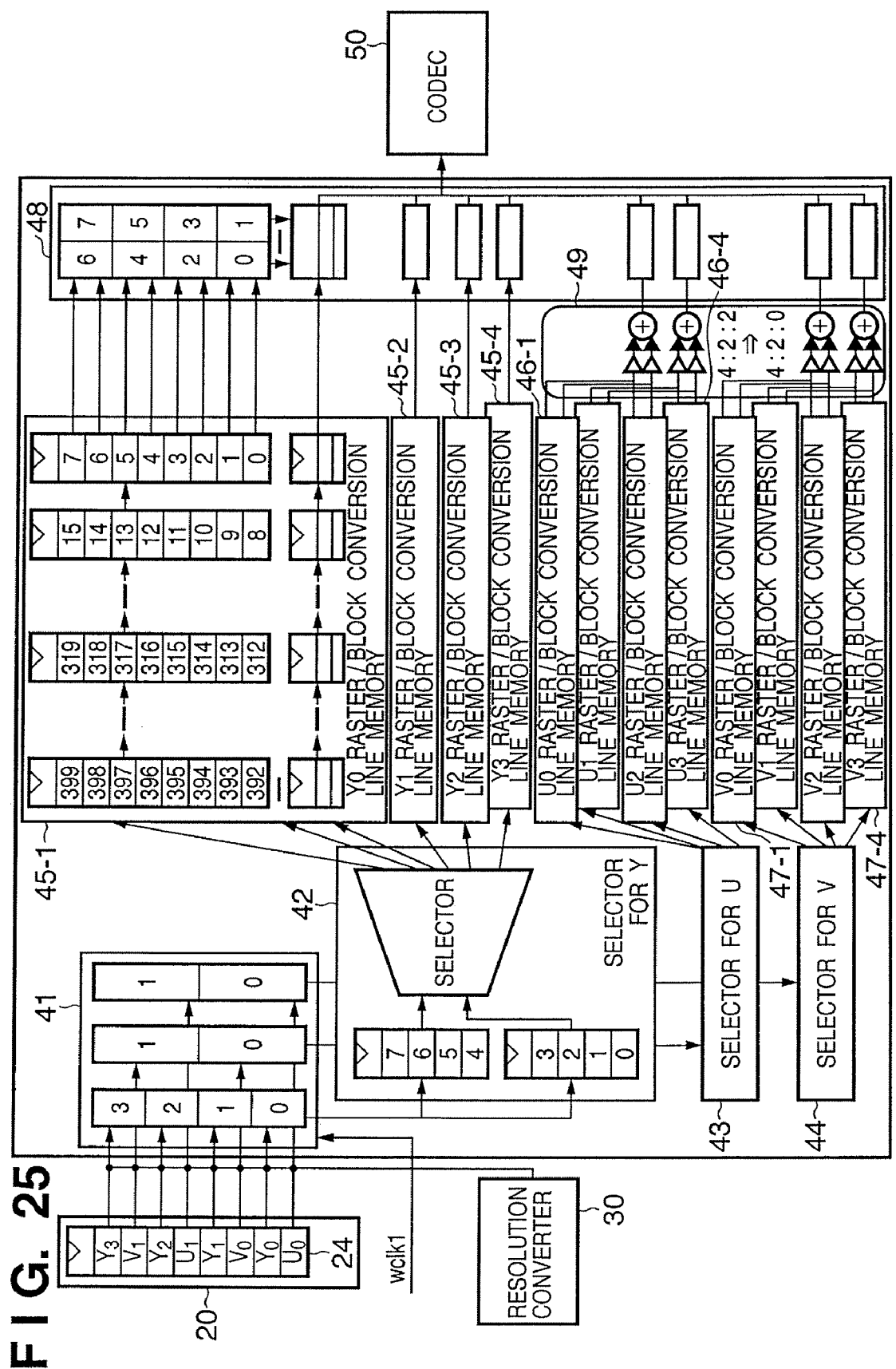
FIG. 25 is a diagram showing the details of a raster/block conversion memory in the seventh embodiment of the present invention.

FIG. 24 is a diagram showing the process flow in the case where two kinds of processing, JPEG compression and MPEG4 compression, are inserted into the codec compression processing. FIG. 25 is a diagram showing the raster/block conversion memory 40 provided with a function of conversion from YUV422 to YUV420 to be required when MPEG4 compression is performed. FIG. 25 resembles FIG. 19 shown in the fifth embodiment, from the viewpoint of the components. However, in comparison with FIG. 19, the line length of each raster/block conversion line memory is half, and the number of lines is doubled instead. When the codec 50 in this embodiment handles MPEG 4, the unit of data to be handled is 16×16 samples, as for Y signals. Therefore, the use of the memory modules constituting each raster/block conversion line memory has been changed from that in FIG. 19 so that the data can be easily provided.

Furthermore, at each of the exits of the raster/block conversion line memories 46-1 to 46-4 and 47-1 to 47-4 for U/V, a data conversion unit 49 for converting YUV422 data to YUV420 data is added. This data conversion unit is a functional block which has been also added and connected because of the change from the use of the memory modules in FIG. 19. The data conversion unit has a function of being skipped if the processing is not necessary.

The operation in FIG. 25 is basically the same as the operation in FIG. 19. The difference is that, since the unit of data transfer is basically 16 lines, the raster/block conversion line memory for Y signals is considered to be configured as a double buffer in which the pair of 45-1 and 45-2 is regarded as one 16-line buffer and the pair of 45-3 and 45-4 is regarded as the other 16-line buffer. Furthermore, the raster/block conversion line memories 46-1 to 46-4 and 47-1 to 47-4 for U/V are similarly considered as double buffers constituted by 46-1 and 46-2, 46-3 and 46-4, 47-1 and 47-2, and 47-3 and 47-4, respectively. Furthermore, when signal conversion from YUV422 to YUV420 is required, new data is created from data of two lines, which are vertically adjacent on an original image, at the data conversion unit 49 positioned at the exit of the line memory.

It is possible to reassemble the raster/block conversion memory 40 from the configuration shown in FIG. 19 to the configuration in FIG. 25 by switching data paths. In this embodiment, the data paths are switched by changing setting of the data paths depending on the characteristics of data to be compressed.

A description will be provided on the operational flow of the image processing unit 1 including the raster/block conversion memory 40 as described above, with the use of FIG. 24 with reference to FIG. 12.

In FIG. 12, VGA-size image data outputted from the developing unit 230 is stored in the frame buffer 10 in frames. As shown in FIG. 24, the inside of the frame buffer 10 is configured in a double buffer form, and image data of the n-th frame and the (n+1)th frame are stored in different areas (buffers A and B).

Now, suppose that accumulation of the n-th frame in the buffer A of the frame buffer 10 has just been completed. Then, frame data transfer completion interrupt from the developing unit 230 to the control sequencer 70 occurs (arrow 1 in FIG. 24).

In response to the frame data transfer completion interrupt, the control sequencer 70 first sets parameters for specifying what processing should be performed by the codec processing unit to the parameter register 51 of the codec 50 (arrow 2a in FIG. 24). In this embodiment, it is assumed that compression using MPEG4 is requested as the first compression processing. Here, the control sequencer 70 sets multiple parameters in the parameter register 51 for causing the codec 50 to perform MPEG4 processing and sets the processing mode of the codec 50 to an MPEG4 processing mode.

Then, the control sequencer 70 instructs the raster/block conversion memory 40 to convert VGA-size image data in the YUV422 format inputted from the image data DMAC 20, to the YUV420 format and provide the data for the codec 50 in the MPEG 4 mode (arrow 4a in FIG. 24). Receiving the instruction, the raster/block conversion memory 40 reassembles the configuration of the data paths as shown in FIG. 25 to enable operation in the MPEG4 mode, and waits for start of data transfer.

Then, the control sequencer 70 instructs the image data DMAC 20 to read the image data of the n-th frame from the buffer A of the frame buffer 10 and start transfer for providing the data for the raster/block conversion memory 40 (arrow 3a in FIG. 24). Receiving the instruction, the image data DMAC 20 reads the image data from the frame buffer 10 and provides it for the raster/block conversion memory 40.

Being provided with the image data, the raster/block conversion memory 40 starts conversion from YUV422 to YUV420 (arrow 7a in FIG. 24) and provides the blocked data for the codec 50 in a predetermined order. Being provided with the blocked image data, the codec 50 performs image compression in the MPEG4 format and sequentially hands the encoded data to the encoded data DMAC 60. The encoded data DMAC 60 transfers the encoded data to the data buffer 12 in predetermined units. When transfer of all the encoded data constituting an image in the n-th frame is completed, the control sequencer 70 sends out encoded data transfer completion interrupt to the data buffer communication unit 3 (arrow 6a in FIG. 24). This interrupt notification is communicated via a control signal transmitted on the control signal line 71 between the image processing unit 1 and the communication unit 3.

In FIG. 24, when the control sequencer 70 recognizes that transfer completion interrupt for the encoded data JPEG4 has been sent out (arrow 6a in FIG. 24), the control sequencer 70 checks the parameter for the image processing requested next. Here, it is assumed that the operation requested next is to perform JPEG compression of the VGA-size image data with the resolution unchanged. Since it is known that there exists JPEG processing using data obtained by performing resolution conversion of data with the same field angle to QVGA data in the subsequent flow, it is necessary to make settings for performing the image compression processing and the resolution conversion processing in parallel.

Therefore, the control sequencer 70 first sets multiple parameters for causing the codec 50 to perform JPEG processing, in the parameter register 51 and sets the processing mode of the codec 50 to a JPEG processing mode (arrow 2b in FIG. 24).

Then, the control sequencer 70 instructs the raster/block conversion memory 40 to change the blocking processing mode to that for JPEG (arrow 4b in FIG. 24). Receiving the instruction, the raster/block conversion memory 40 reassembles the configuration of the data paths from the configuration shown in FIG. 25 to that as shown in FIG. 19 to enable operation in the JPEG mode, and waits for start of data transfer.

Then, the control sequencer 70 instructs the resolution conversion unit 30 to perform resolution conversion of VGA-size image data inputted from the image data DMAC 20 to the QVGA size (the timing is not shown).

Then, the control sequencer 70 instructs the image data DMAC 20 to read the image data of the n-th frame from the buffer A of the frame buffer 10 and start transfer for providing the data for the codec 50 (arrow 3b in FIG. 24).

In this embodiment, it is necessary to provide the data read from the frame buffer 10 for the resolution conversion unit 30 and the raster/block conversion memory 40 in parallel, and a parameter is set in the transfer area setting register 21 so that it is achieved.

When the image data DMAC 20 starts data transfer, the resolution conversion unit 30 starts image conversion from VGA to QVGA (arrow 8b in FIG. 24) and accumulates the data in the frame buffer (2) 13. Meanwhile, receiving the image data blocked by the raster/block conversion memory 40, the codec starts compression in the JPEG method (arrow 5b in FIG. 24) and sequentially hands the encoded data JPEGb which has been compressed in the JPEG method to the encoded data DMAC 60.

The encoded data DMAC 60 transfers the encoded data to the data buffer 12 in predetermined units. When transfer of the encoded data JPEGb in the n-th frame is completed, the control sequencer 70 sends out an encoded data transfer completion interrupt to the data buffer communication unit 3 (arrow 6b in FIG. 24). This interrupt notification is communicated via a control signal transmitted on the control signal line 71 between the image processing unit 1 and the communication unit 3. Next, JPEG compression processing is started with the use of the image data which has been resolution-converted to QVGA and accumulated in the frame buffer (2). Since the subsequent process is similar to that in the embodiments described above, description thereof will be omitted.

In this embodiment also, the processing performance determination unit 311 is assumed to exist in the network control unit 310 of the communication unit 3. However, it is also possible, for example, to arrange it in the image processing unit 1 or implement it as a part of functions incorporated in the control sequencer 70 of the image processing unit 1, similarly to the first embodiment. Its position is not limited by this embodiment. However, similarly to the first embodiment, from the viewpoint of reducing the entire processing load as far as possible by performing only necessary data transmission, it is more desirable that the processing performance determination unit 311 exists in the network control unit 310 of the communication unit 3 as in this embodiment.

Thereby, it is possible to efficiently perform image compression processing in multiple encoding methods within one picture period with one codec, in addition to the effects of the first to sixth embodiments described above. Especially, by having a mechanism for dynamically switching data paths depending on the compression method, it is possible to effectively utilize internal memory and to enhance the processing capability while improving efficient utilization of resources inside the IC.

According to the present invention, it is possible to perform image processing multiple times within one picture period with one codec, without implementing multiple processing units in parallel, and therefore, it is possible to provide multiple services for users on a network who issue various requests, while maintaining the real-time nature. Furthermore, since it is possible to provide services without implementing multiple processing units in parallel, it is possible to provide the services without restricting the content of the services (the kind of picture compression method, resolution, the Q value and the like) by the number of processing units in advance, within the range where the real-time nature is not impaired.

Since an encoding processing unit capable of setting a processing parameter multiple times within one picture period is provided, it is possible to perform encoding processing in accordance with various image parameters requested by users on one processing unit within one picture period. For example, it is possible to smoothly display time-varying images with different qualities on display terminals of multiple users, without dropping frames. Furthermore, since the necessity of implementing multiple processing units in parallel is eliminated, the area of a board or chip can be reduced, and power consumption can be also reduced. As a result, it is possible to provide a small-sized image capturing apparatus.

Furthermore, there is provided a processing performance determination unit for determining the content of processing operations which can be performed within one picture period, based on requests from users on a network and for specifying at least the order of the image processing operations or the content of the image processing operations performed by the image processing unit. As a result, it is possible to effectively utilize the unit performance, such as image compression processing, to the maximum of its performance, and it is possible to provide multiple services for more users within one picture period with one codec, while maintaining the real-time nature of the apparatus. Furthermore, the processing performance determination unit is provided for the network communication unit. Thereby, it is possible to realize the above functions while reducing internal data communication more, and improvement of the entire processing performance and reduction of power consumption can be realized.

Furthermore, in addition to the encoding processing unit, the image processing unit further includes an image clipping processing unit capable of setting a processing parameter multiple times within the one picture period. As a result, in addition to the effect obtained by providing the encoding processing unit, it is possible to create multiple partial area images from one high-resolution image by specifying any position and any size in response to various requests from users, and to perform image processing using the multiple partial area images within one picture period on one processing unit.

In addition to the encoding processing unit, the image processing unit further includes a resolution conversion unit capable of setting a processing parameter multiple times within one picture period. As a result, in addition to the effect obtained by providing the encoding processing unit, it is possible to perform image processing of multiple areas and image processing of images with multiple resolutions within one picture period with one codec. Especially, it is possible to process images with an arbitrary field angle and arbitrary resolution based on users' requests obtained from a high-resolution picture, such as an image obtained by clipping any area of a taken image with high resolution and performing resolution conversion and a partially clipped image which is not resolution-converted, within one picture period with one codec for multiple users. Furthermore, it is possible to perform processing of high-resolution data with the use of multiple picture periods. Especially, by assigning JPEG-compression of UXGA-size data to two successive picture periods, and controlling the processing order in providing services so that the processing is temporally continuously performed, the necessity of providing a frame buffer for keeping high-resolution data through multiple picture periods exclusively for the processing is eliminated, and thereby the effect of saving the memory size is obtained.

Furthermore, the image processing unit includes a frame buffer for temporarily accumulating image data for which resolution conversion processing has been performed to enable subsequent processing within one picture period. As a result, when resolution conversion processing of images with the same field angle is requested by multiple display terminals, the necessity of repeating the same resolution conversion, performing compression based on too detailed data and the like can be eliminated, and the time required for subsequent resolution conversion processing can be shortened. Thus, it is possible to improve the content of processing which can be performed on one processing unit within one picture period.

Furthermore, the image processing unit has an image data DMA mechanism for providing one image data for the encoding processing unit and the resolution conversion unit temporally in parallel. As a result, it is possible to reduce the number of times of and the time required for reading original data before resolution conversion in the case where it is requested by multiple display terminals to process images with the same field angle and different resolutions within the same picture period, and accordingly, the band performance of memories and buses can be effectively used. Especially, an effect of shortening the processing time required at a part related to image processing using high-resolution image data can be expected, and it is possible to improve the content of processing which can be performed on one processing unit within one picture period. As a result, it is possible to perform processing responding to different requests from more users.

Furthermore, partial data remaining after excluding partial data from one image data is separately provided for the resolution conversion unit, and data obtained as a result of resolution conversion processing which has been dividedly performed is processed by the encoding processing unit as one image data. As a result, it is possible to reduce the number of times of and the time required for reading image data from the frame buffer. Especially, since partial data can be also used in parallel, an effect of shortening the processing time required at a part related to image processing using high-resolution image data can be expected, and it is possible to improve the content of processing which can be performed on one processing unit within one picture period. Furthermore, by adding a function of performing processing through multiple picture periods in the case of continuously performing processing of partial images for multiple successive picture periods, it is possible to further enhance the processing capability and reduce the variation among processing capabilities in the multiple picture periods due to a difference in the degree of parallelization of execution.

By causing encoding processing of image data to correspond to multiple types of encoding processing operations, it is possible to efficiently perform image compression processing in multiple encoding methods within one picture period with the use of one codec. Especially, by dynamically changing the data paths of the raster/block conversion unit according to multiple types of encoding processing operations, it is possible to handle multiple types of encoding processing operations without providing multiple raster/block conversion units. As a result, the memory use efficiency of the entire system is improved, and a reduction of the size of a chip and the size of an image capturing apparatus are realized.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-321230 filed on Nov. 4, 2005, which is hereby incorporated by reference herein in its entirety.

What is claimed is:

1. An image capturing apparatus comprising:
    an image capturing unit configured to acquire image data during a predetermined time interval by capturing an image of a subject;
    an image processing unit configured to perform image processing of the image data acquired by the image capturing unit;
    a network communication unit configured to receive plural types of requests for the image data, and to send out the image data processed by the image processing unit onto a network during a time period corresponding to the predetermined time interval;
    a processing performance determination unit configured to determine the content of processing to be able to be processed within the predetermined time interval based on the requests received by the network communication unit and to specify at least the order of image processing or the content of the image processing to the image processing unit;
    wherein the image processing unit performs plural image processing operations based on the order of image processing or the content of the image processing specified by the processing performance determination unit within the time period corresponding to the predetermined time interval.

2. The image capturing apparatus according to claim 1, wherein
    the image processing unit encodes the image data acquired by the image capturing unit; and
    the image processing unit sets, upon performing the encoding operation, parameters relating to the encoding within the time period corresponding to the predetermined time interval.

3. The image capturing apparatus according to claim 1, wherein
    the image processing unit performs clipping of partial data from the image data acquired by the image capturing unit, and
    the image processing unit sets, upon performing the clipping operation, parameters relating to the clipping operation within the time period corresponding to the predetermined time interval.

4. The image capturing apparatus according to claim 1, wherein
    the image processing unit performs a resolution conversion operation on the image data acquired by the image capturing unit; and
    the image processing unit sets, upon performing the resolution conversion operation, parameters relating to the resolution conversion operation within time period corresponding to the predetermined time interval.

5. The image capturing apparatus according to claim 4, wherein the image processing unit includes a frame buffer that accumulates the image data for which the resolution conversion has been performed to enable subsequent processing within the time period corresponding to the predetermined time interval.

6. The image capturing apparatus according to claim 4, wherein
    the image processing unit further includes an encoding unit that encodes the image data acquired by the image capturing unit and a resolution converter performing the resolution conversion operation on the image data acquired by the image capturing unit, and
    the image processing unit has an image data DMA mechanism that provides the encoding unit and the resolution converter with the image data temporally in parallel.

7. The image capturing apparatus according to claim 6, wherein
    the DMA mechanism provides first partial data of one image data for the encoding unit and the resolution converter temporally in parallel; and
    the image processing unit separately provides second partial data remaining after excluding the first partial data from the one image data for the resolution converter and processes data obtained as a result of the resolution conversion processing which has been dividedly performed, by the encoding unit as the one image data.

8. The image capturing apparatus according to claim 2, wherein
the image processing unit further includes an encoding unit that encodes the image data acquired by the image capturing unit and a raster/block converter that performs raster/block conversion of the image data acquired by the image capturing unit;
encoding the image data by the encoding unit corresponds to multiple types of encoding; and
the image processing unit dynamically changes the data paths of the raster/block converter according to the multiple types of encoding.

9. The image capturing apparatus according to claim 1, wherein the processing performance determination unit is provided for the network communication unit.

10. An image capturing method comprising the steps of:
acquiring image data during a predetermined time interval by capturing an image of a subject;
performing image processing of the image data acquired by the image capturing step;
receiving plural types of requests for the image data;
sending out the image data processed by the performing step onto a network during a time period corresponding to the predetermined time interval;
determining the content of processing to be able to be processed within the predetermined time interval based on the requests received by the receiving step and specifying at least the order of image processing or the content of the image processing to the processing step;
wherein plural image processing operations based on the order of image processing or the content of the image processing specified by the determining step are performed by the performing step within the time period corresponding to the predetermined time interval.

11. A computer-readable storage medium storing a computer program for instructing a computer to execute the image capturing method according to claim 10.

12. An image capturing apparatus comprising:
an image capturing unit configured to acquire image data by capturing an image of a subject;
an image processing unit configured to perform image processing of the image data acquired by the image capturing unit;
a network communication unit configured to receive plural types of requests for the image data;
a determining unit configured to determine a time interval, for each of the requests, to send out the image data of each frame processed by the image processing unit; and
a control unit configured to control the image processing unit to perform image processing operations corresponding to the plural types of requests within the time interval determined by the determining unit, and
wherein the network communication unit sends out the image data processed by the image processing unit onto a network at the time interval determined by the determining unit.

* * * * *